July 9, 1940.

J. E. KANE 2,207,407

HAT MAKING APPARATUS

Filed March 30, 1939

INVENTOR
John E. Kane
BY
Blair, Curtis, Dunne + Hayward
ATTORNEYS

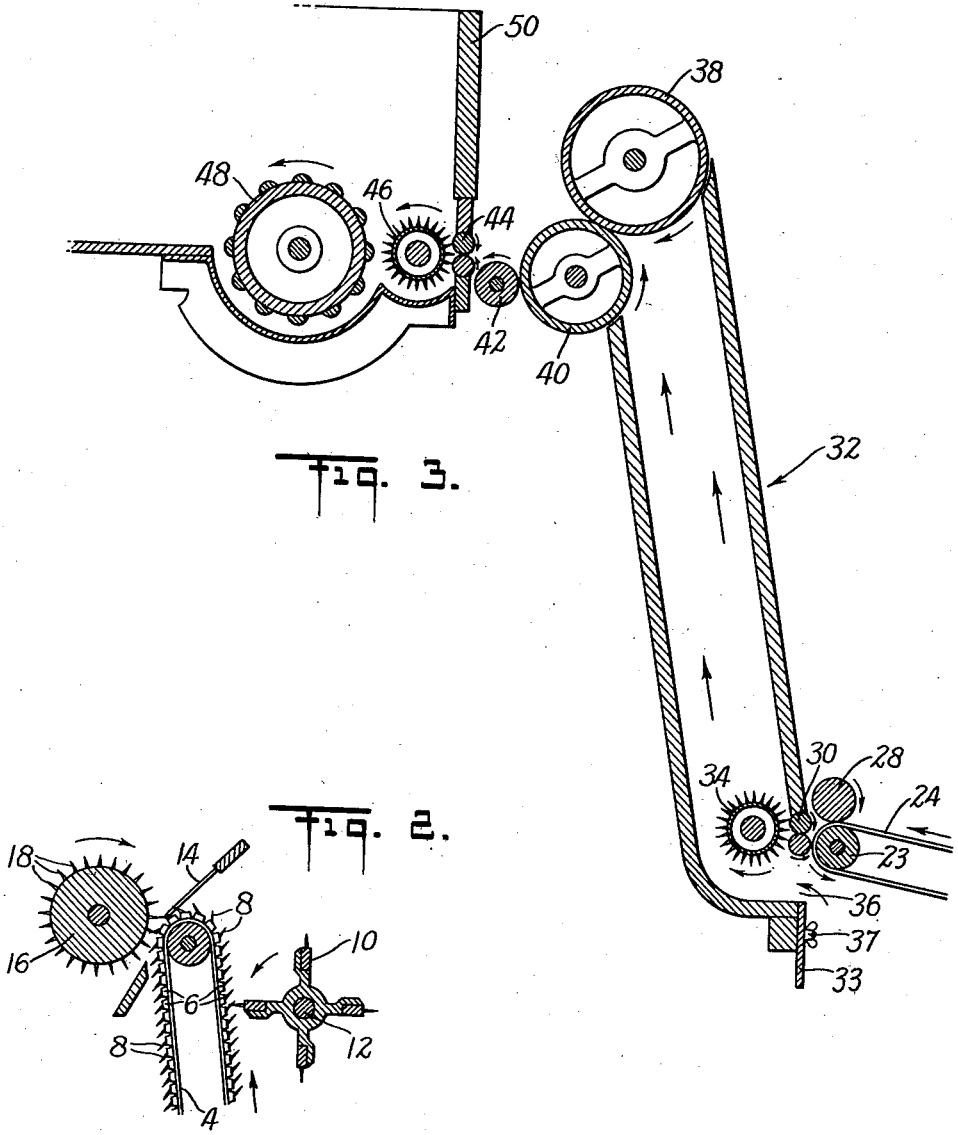

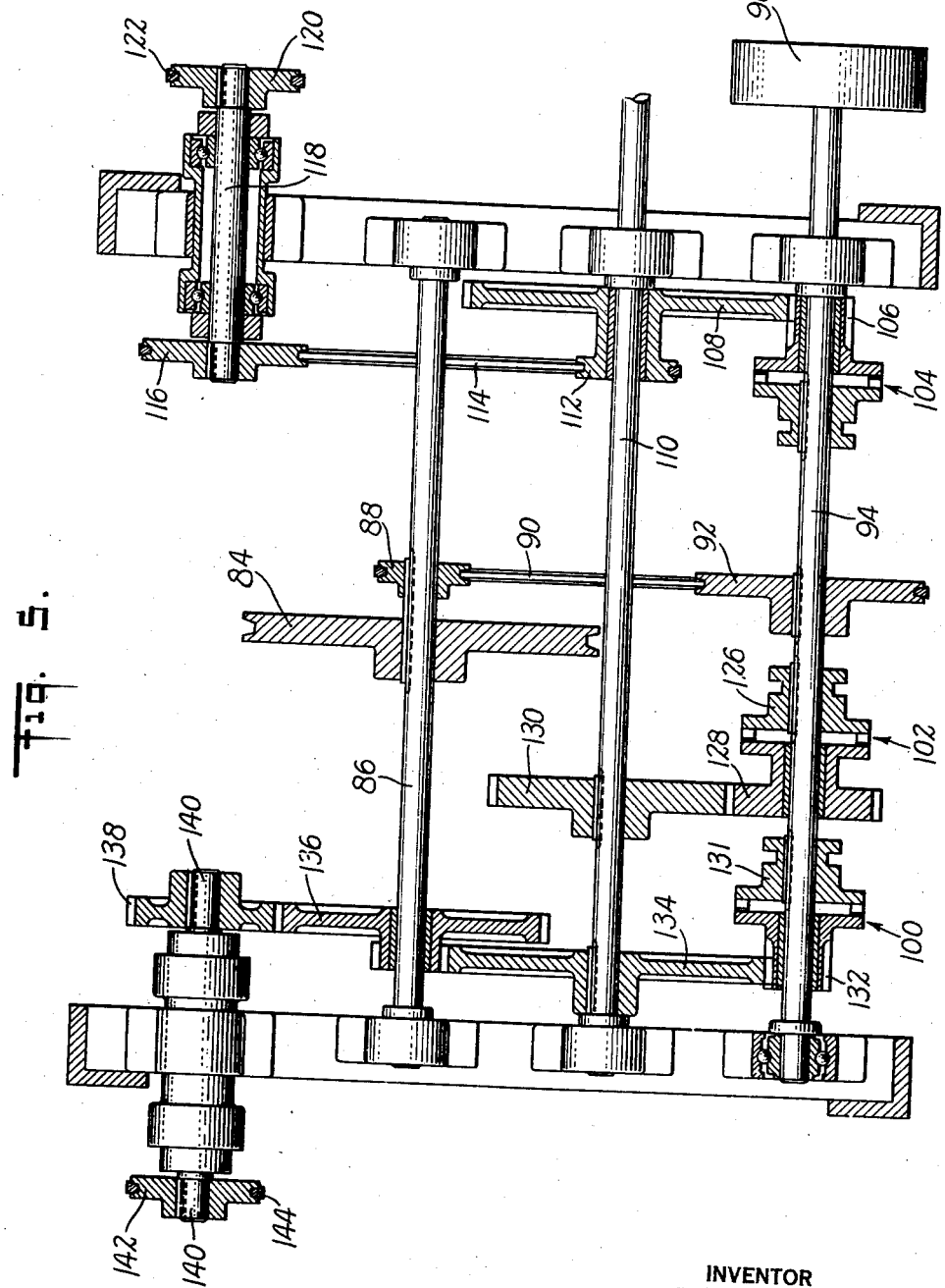

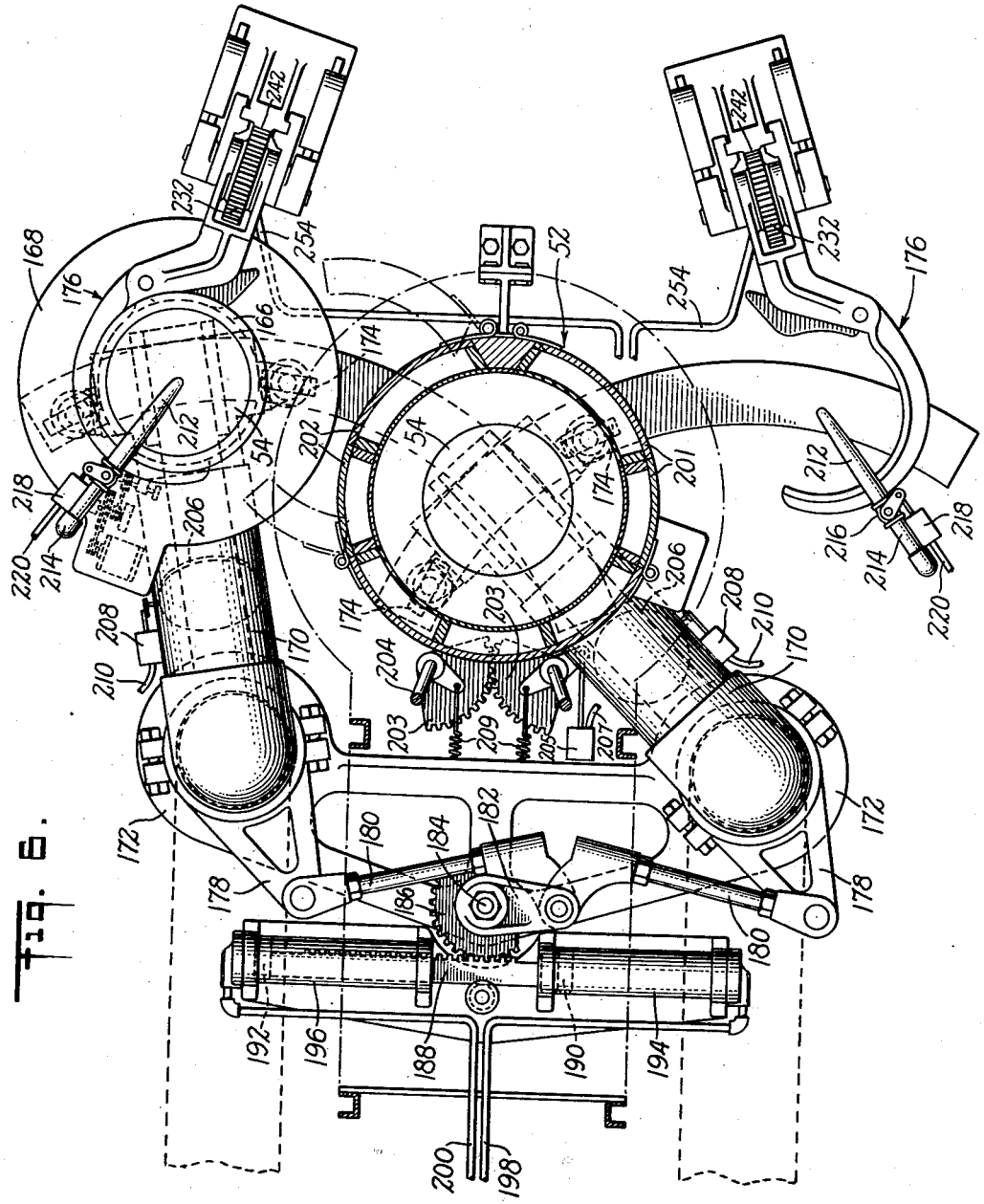

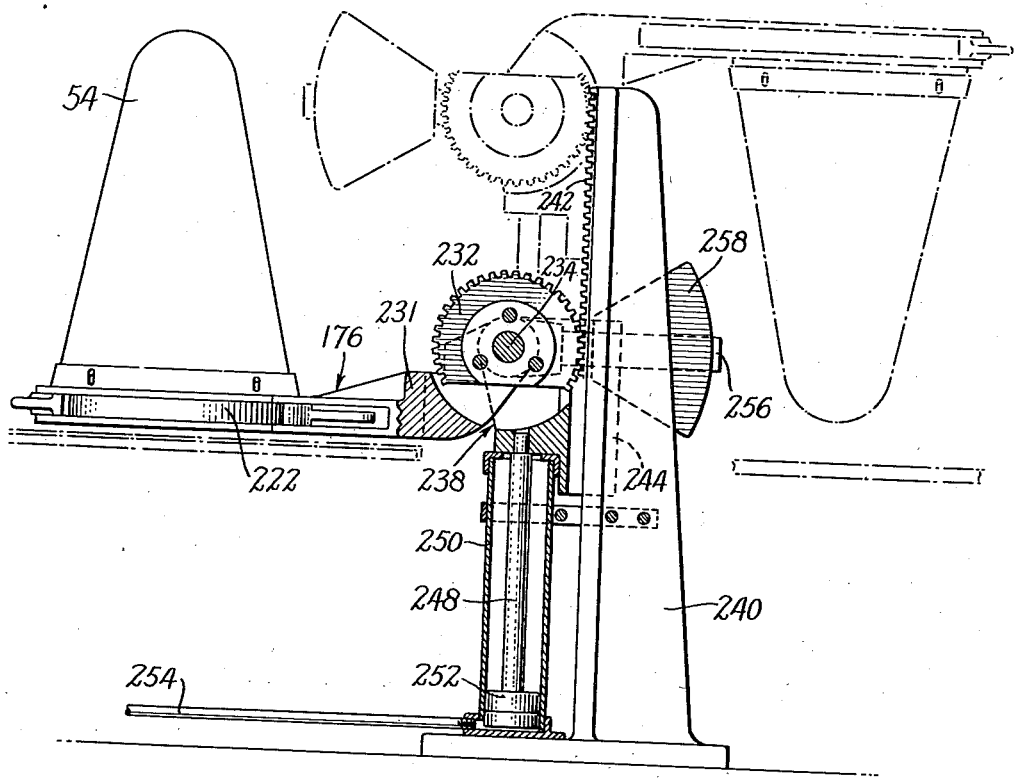
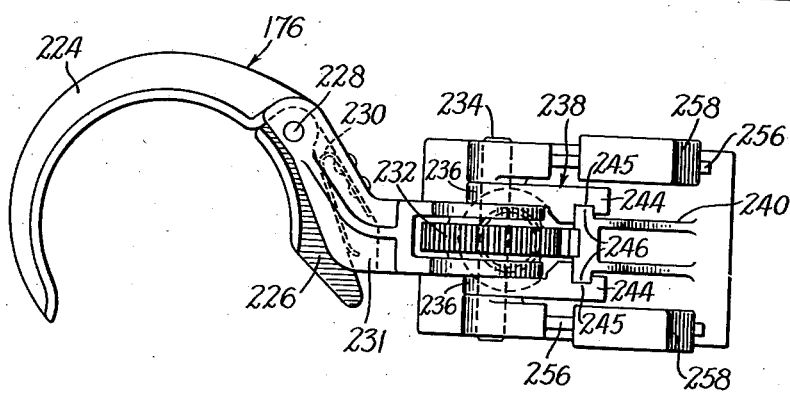

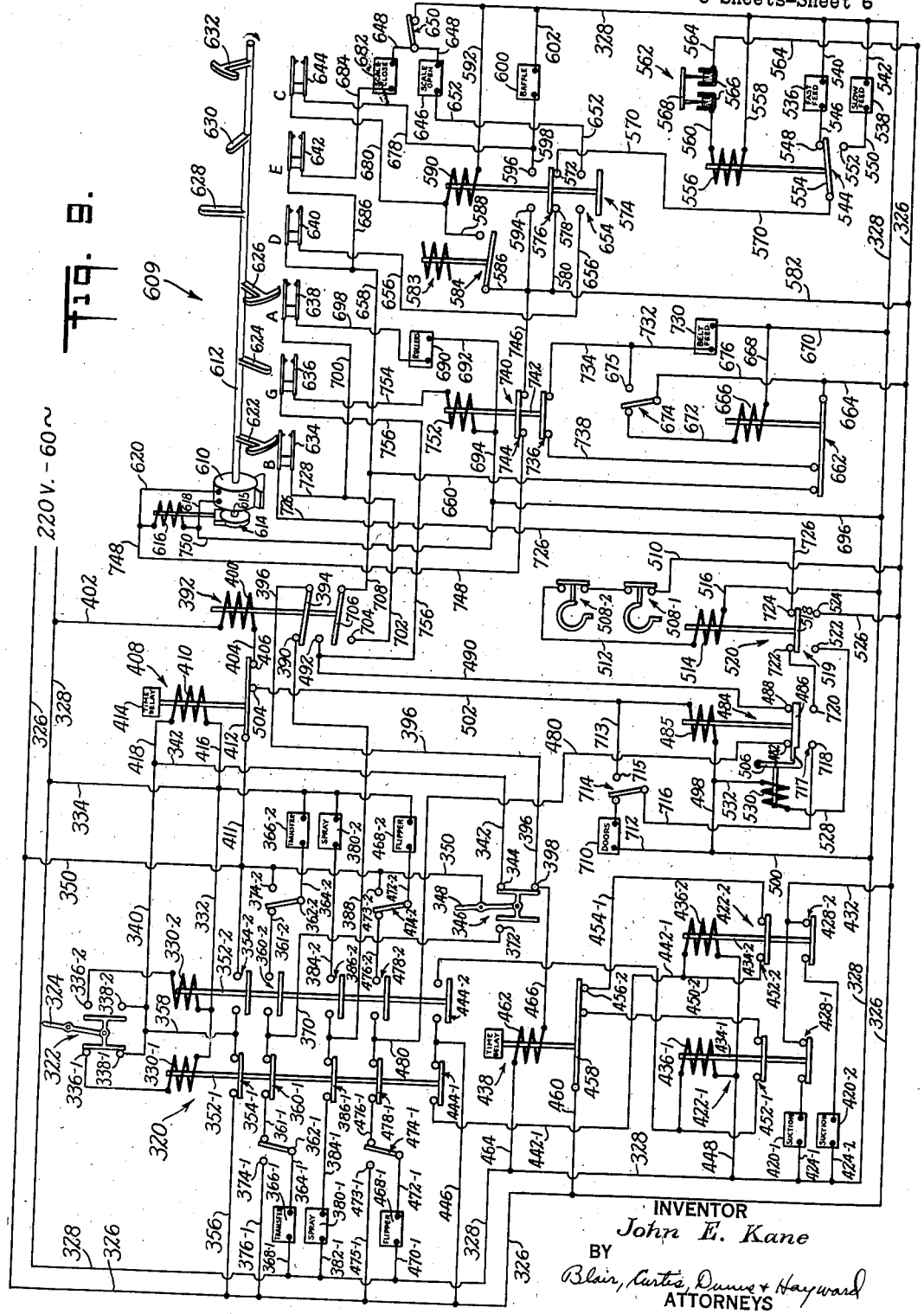

Patented July 9, 1940

2,207,407

UNITED STATES PATENT OFFICE 2,207,407

HAT MAKING APPARATUS

John E. Kane, Danbury, Conn., assignor to The Frank H. Lee Company, Danbury, Conn., a corporation of Connecticut Application March 30, 1939, Serial No. 264,903

62 Claims. (Cl. 19—148)

This invention relates to making felt and, more in particular, to an apparatus and a method for forming hat bodies or bats from fur.

An object of this invention is to provide a method and apparatus for delivering fur in a carefully controlled and efficient manner to a bat forming element, such as a perforated cone. A further object is to provide means of the above character for receiving bulk fur and producing from this fur bats of predetermined characteristics. A further object is to provide thorough and practical methods of operation and control for apparatus of the above character. A still further object is to provide apparatus which is compact, efficient, and dependable in operation. These and other objects will be more fully pointed out hereinafter.

The invention accordingly consists in the features of construction, combinations of elements, arrangements of parts and in the several steps and relation and order of each of the same to one or more of the others, all as will be illustratively described herein, and the scope of the application of which will be indicated in the following claims.

Figure 2 is an enlarged detail of the upper right-hand portion of Figure 1;

Figure 3 is an enlarged detail of the central portion of Figure 1;

Figure 4 is a top view of the structure shown in Figure 2;

Figure 5 is a sectional view on the line 5—5 of Figure 1 showing the speed reduction and control mechanism;

Figure 6 is a sectional view on the line 6—6 of Figure 1;

Figure 7 is a side elevation partly in section of the flipper mechanism for inverting the cones;

Figure 8 is a top view of the structure shown in Figure 7; and

Figure 9 is a schematic wiring diagram showing the control circuit for the entire apparatus.

Figure 1:
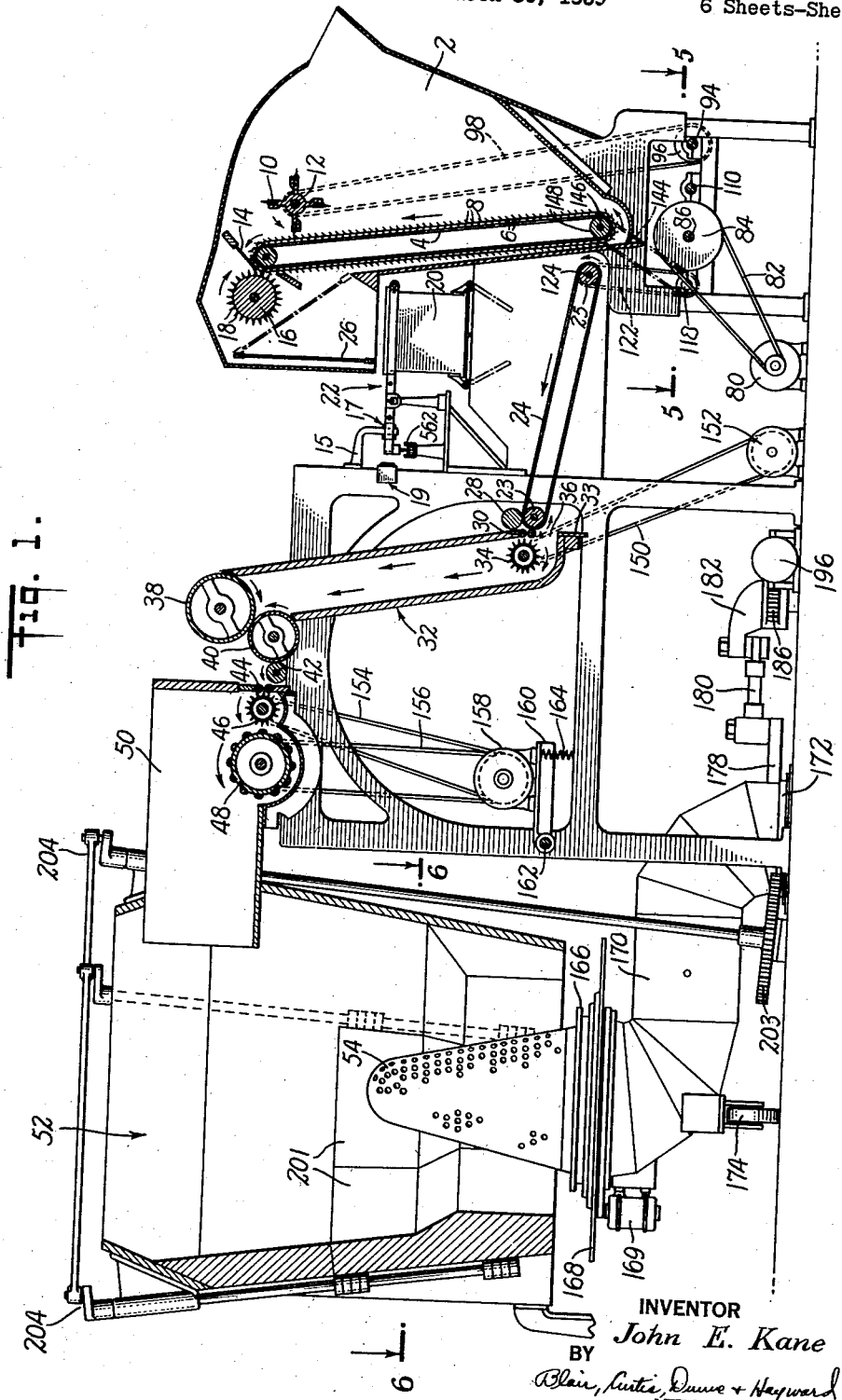
Figure 1 is a vertical longitudinal section with certain structures shown in broken lines and with certain details omitted for clarity.

In the illustrative embodiment of my invention described herein, some of the apparatus is similar to that disclosed in the copending application of George T. Birdsall, Serial No. 173,285, filed November 9, 1937, issued September 12, 1939, as Patent No. 2,172,343.

In making hat bodies or bats, it is important that the process be carried on without interruption, and that the resulting bats be of a uniform high quality. In obtaining these results, the amount of fur which is deposited to form each bat must be carefully measured, and the fur must be deposited in a uniform manner.

Illustratively, the fur is stored in bulk form, and when it is to be used, it is placed in a hopper. From this hopper, the fur is dispensed to a weigher which accurately divides the fur into individual quantities each of which is sufficient for a single bat. These individual quantities of fur are successively carried by means of a conveyor mechanism to the hat former, and during this process, the fur is carefully subdivided so that the separate hairs move individually as they fall onto the bat-forming element or perforated cone. After the quantity of hair sufficient for one hat is deposited upon a cone, the cone is removed from the forming tower, and the bat is wetted and stripped from the cone for further operations. The various steps of this process are properly correlated in the present embodiment so that the entire mechanism operates as a unit; thus, the fur weighing unit, the fur conveying and separating unit, and the bat former all cooperate to produce bats in an efficient manner. This result is obtained by providing a central unified control which depends mainly upon electrically operated solenoids some of which in turn control air valves and air pressure circuits.

Referring particularly to the right of Figure 1, a hopper 2 is provided with a vertically extending apron 4 which is in the form of an endless belt built up of strips 6 each of which is provided with a plurality of barbs 8. Apron 4 moves, as indicated by arrows, with the right-hand side moving upwardly and carries fur from the hopper. Barbs 8 are rigidly set in their respective strips at an angle, extending toward the direction of movement. Thus, they tend to grab and retain the fur as they move the fur forward.

Adjacent the top of the apron and to the right thereof is a rapidly rotating back wiper 10 which is formed of four barb-carrying strips evenly spaced about a shaft 12. Back wiper 10 rotates counter clockwise with the side adjacent apron 4 moving opposite to the direction of movement of the apron. Thus, the barbs on wiper 10 scrape excess fur from the barbs 8 of apron 4 and permit only a layer of predetermined thickness to move from the hopper.

As shown best in Figure 2, above and to the left of back wiper 10 and with their ends tensioned against apron 4 are resilient holding fingers 14 (see also Figure 4). Holding fingers 14 are of substantial width and are positioned to interfit with barbs 8 on apron 4, and, thus, tightly contact the layer of fur on the apron. To the left of the top of apron 4 (Figures 1 and 2) is mounted a front wiper 16 which is a wooden roller carrying a plurality of barbs 18. Front wiper 16 rotates very rapidly with respect to the movement of apron 4, and as the layer of fur emerges from under the ends of the fingers 14, it is picked from the apron by barbs 18, and, thus, the fur is thoroughly separated.

This finely divided fur falls from front wiper 16 (see Figure 1) down to the hopper 20 of the balance scale mechanism, generally indicated at 22. Hopper 20 is provided with a dumping bottom which is controlled by solenoids in a manner more clearly pointed out below. When the proper amount of fur has been delivered to the scale hopper, the dumping mechanism is operated, and the fur falls onto an endless belt 24 which extends between a pair of rollers 23 and 25. During the dumping operation, fur is diverted from the top of the scale hopper by a baffle 26 which normally hangs in the vertical position shown, but which is moved to the broken-line position when the scale dumping mechanism operates. The fur is carried to the left on apron 24, and, at the left, it moves under an idler roller 28 to a pair of feed rollers 30.

Referring to Figure 3, as the fur emerges from the left of the feed rollers, it enters the bottom of a vertically extending chute or passageway, generally indicated at 32; this passageway extends the entire width of the machine. Within this passageway and adjacent feed rollers 30 is a rapidly rotating picker 34 which rotates clockwise and separates the fur and impels it with a stream of air upwardly within the passageway. Below the picker, passageway 32 is provided with an adjustable air inlet 36, and picker 34 rotates at such a rate that air moves in through inlet 36 and up the passageway. The size of inlet 36 is varied by moving plate 33 vertically; plate 33 is adjustably held in position by a plurality of thumb-nuts 37.

Extending along the top of passageway 32 are two perforated sieve-rollers 38 and 40 which extend the width of the machine and totally close the top of the passageway. The perforations in these sieve-rollers form an air outlet for the air which is drawn in at the bottom of the passageway, and, as the air escapes, the fur impelled upwardly by picker 34 and entrained in the air moves against the sieve-rollers 38 and 40 forming layers of fur thereon. Sieve-roller 38 rotates clockwise, and sieve-roller 40 rotates counterclockwise, and the two layers of fur formed on the two sieve-rollers combine where the rollers meet into a single layer of fur which is carried over the top of sieve-roller 40 and is fed by a roller 42 into a pair of feed rollers 44. As the layer of fur emerges at the left of feed rollers 44, it is caught by a top picker 46, and the fur is completely subdivided and moves over roller 48 to the left.

Referring again to Figure 1, top picker 46 and roller 48 are enclosed in a chute 50 which extends to the top of the forming tower, generally indicated at 52. Forming tower 52 encloses a perforated cone 54 which is movably supported upon a rotating base and which is provided with an internal suction in a manner more fully pointed out below. Top picker 46 and roller 48 are so adjusted that when fur is being deposited, the fur moves in a steady stream from chute 50 into the top of forming tower 52 and downwardly toward the perforated cone 54. The suction on cone 54 is sufficient to draw the individual hairs onto the cone, and a bat is formed of uniform thickness throughout.

When the quantity of fur to form a bat has been deposited upon a cone, the sieve-rollers 38 and 40 are stopped, and fur is no longer delivered to the forming tower 52. The vertically swinging doors 201 and 202 (see also Figure 6) of forming tower 52 then open, and the cone with the bat thereon is swung out of the forming tower. Simultaneously, another cone is moved into the forming tower and the forming tower doors are closed again.

The cone with the bat thereon is moved to a spray 212 and the bat is sprayed with hot water. Automatic flipper means, shown best in Figures 7 and 8, then inverts the cone, and the bat is stripped from the cone. The empty cone is returned to its position at the side of the forming tower and is ready for use again. During the movement of the cone from the forming tower with the bat thereon, full suction is maintained on the cone, but as the bat becomes wet, this suction is removed. The suction is again placed on the cone at the time the cone is returned to the forming tower.

Reverting to the weighing and conveying mechanism, as soon as a quantity of fur for one bat has been weighed, the bottom-dumping mechanism of hopper 20 closes again, and the baffle 26 returns to the position shown in full lines. Apron 4 starts conveying a new quantity of fur to the hopper, and by the time the previously weighed quantity of fur has been deposited upon a cone in the forming tower, a new quantity of fur has been weighed and dumped onto the endless belt 24.

During the actual weighing of the fur, no fur is delivered to endless belt 24, and, thus, the fur moves through the fur dividing and conveying mechanism to the forming tower in definitely divided quantities which are spaced apart. However, as indicated above, sieve-rollers 38 and 40 are stopped during the time that the cones are being moved to and from the forming tower. The portion of a particular quantity of fur which reaches sieve-rollers 38 and 40 before the cone which is to receive it is properly positioned remains on the surface of the sieve-rollers and is not immediately conveyed to the forming tower. Also, any portion of a previous quantity of fur that has been delayed in its movement to the sieve-rollers is temporarily stopped and is not delivered to the forming tower during the time that the cones are being changed.

The fur fed to sieve-rollers 38 and 40 during the time that they are stopped forms layers thereon, and when the sieve-rollers are started again, this fur is fed through feed rollers 44 to picker 46 and thence to the forming tower. This initial quantity of fur deposited upon each cone is sufficient to form a thin layer of fur over the entire cone. Thus, there is no tendency for fur to be drawn through the perforations in the cone as might occur if the feeding of the fur started slowly. The quantity of fur initially delivered to the cone in this manner depends upon the amount of fur delivered to the sieve-rollers while they are stopped.

In the present embodiment, the control is such that if the sieve-rollers are not started at the time the proper quantity of fur has been deposited thereon, endless belt 24 and feed rollers 30 are temporarily stopped. It should also be noted that the sieve-rollers are stopped a short time prior to the opening of the doors of the forming tower, and are started again a short time prior to the closing of these doors. Thus, the time delay involved in moving the fur from the sieve-rollers to the cone does not delay the actual process of forming bats.

In the present embodiment, the fur is rapidly and accurately weighed by delivering the fur to the hopper at a rapid rate during the time that the major portion of the fur is being delivered to the hopper, and then delivering the fur at a slower rate when the amount of fur in the hopper approaches the desired weight. Accordingly, the weighing mechanism is provided with a mercury switch 562 which is opened when the the scale arm makes the first movement toward the balanced position; this movement occurs when substantially the desired quantity of fur has been delivered to the hopper. The opening of this mercury switch trips a relay which reduces the speed of apron 4 with the result that fur is delivered to the hopper at a very slow rate.

Mounted adjacent switch 562 is a bracket 15 which carries a spot light, generally indicated at 17. Spot light 17 normally plays a beam of light on a photo-electric cell unit, generally indicated at 19. When the desired quantity of fur has been delivered to the hopper, and the scale arm tips to the balanced position, the arm intercepts this light beam. When this light beam is intercepted, photo-electric cell unit 19 operates relays in a manner pointed out below to stop apron 4; baffle 26 is also moved to the broken-line position to deflect fur from the top of the hopper, and a circuit is conditioned to permit the opening of the bottom-dumping mechanism for hopper 20. Simultaneously, a timed switch is instantaneously closed to release a latch which normally holds the bottom-dumping mechanism closed; when this latch is released, the bottom-dumping mechanism opens permitting the fur to fall on endless belt 24.

Apron 4, wipers 10 and 16, and endless belt 24 are driven by a motor 80 through a speed reduction mechanism at the base of hopper 2. Accordingly, motor 80 is connected by a V-belt 82 to a centrally positioned pulley 84 (see Figure 5) keyed to a driving shaft 86. To the right of pulley 84 and also keyed to shaft 86 is a small pulley 88 which is connected through a V-belt 90 to pulley 92 keyed to a shaft 94. At its right end, shaft 94 carries a pulley 96 which, as shown in broken lines in Figure 1, drives back wiper 10 through a belt 98. Back wiper 10 and front wiper 16 are connected through pulleys and a belt (not shown) and the two wipers are rotated when motor 80 operates.

Referring again to Figure 5, shaft 94 carries three clutch units, generally indicated at 100, 102 and 104. Each of these clutch units includes two members mounted upon shaft 94 one of which is a gear member rigidly held from endwise movement but is free to rotate with respect to the shaft and the other of which is keyed to the shaft but is slidable thereon. Each slidable member normally remains out of engagement with its cooperating gear member but is moved into engagement therewith by the energization of a solenoid which moves an operating arm (not shown). Thus, upon the energization of the solenoid which controls one of the clutches, the slidable member is moved into engagement with the rotatable gear member and both members rotate with the shaft.

The gear member 106 of clutch unit 104 meshes with a gear 108 which is mounted to rotate freely on an intermediate shaft 110. Gear 108 has integral therewith a pulley 112 which is connected through a V-belt 114 to a pulley 116, mounted on one end of a stub-shaft 118. Upon the other end of stub-shaft 118 is mounted a pulley 120 which, as shown in broken lines in Figure 1, is connected by means of a V-belt 122 to a pulley (not shown) mounted upon the end of a shaft 124 carrying driving roller 25 for endless belt 24. At the left, roller 23 is connected through gears (not shown) to feed rollers 30. In this manner, endless belt 24 and feed rollers 30 are driven whenever motor 80 is energized, and clutch 104 (Figure 5) is closed.

As previously pointed out, apron 4 (Figure 1) is driven at a relatively fast speed during the time that the major portion of the fur is being delivered to the hopper 20, but as the quantity of the fur in the hopper approaches the desired weight, the speed of apron 4 is slowed down. Thus, the weighing of the fur is accomplished in a minimum of time, and the weighing is accurate. The means for providing this varying speed is shown at the left of Figure 5.

Clutch unit 102 is provided with a slidable member 126 keyed to shaft 94, and a rotatable gear member 128 which interengages gear wheel 130 keyed to intermediate shaft 110. In a like manner, clutch unit 100 is provided with a slidable member 131 keyed to shaft 94 and a rotatable gear member 132 interengaging with a gear 134 keyed to shaft 110. Mounted to rotate freely on driving shaft 86 is a double gear unit 136, the small gear of which cooperates with gear 134. The large gear of double gear unit 136 cooperates with a gear 138 keyed to one end of stub-shaft 140. The other end of stub-shaft 140 carries a pulley 142 which, as indicated in broken lines in Figure 1, is connected by a V-belt 144 to a pulley (not shown) upon the end of a shaft 146. Integral with shaft 146 is a driving roller 148 which carries the lower end of apron 4.

When apron 4 is being driven at slow speed, the solenoid is energized which closes clutch unit 100 (Figure 5). The movement of shaft 94 is transmitted through gears 132, 134, 136, and 138 to stub-shaft 140, and from stub-shaft 140 through pulley 142 (Figure 1) and V-belt 144 to the shaft 146 of the driving roller 148 which carries the apron. When apron 4 is driven at its fast speed, clutch unit 100 (Figure 5) is open, and the solenoid is energized which closes clutch unit 102. The movement of shaft 94 is transmitted through gears 128 and 130 to intermediate shaft 110 and from intermediate shaft 110 through gears 134, 136, and 138, stub-shaft 140, pulley 142 (Figure 1), V-belt 144, shaft 146, and driving roller 148 to the apron.

With this type of drive, power is delivered constantly from motor 80 to pulley 84 and to endless belt 24 and feed rollers 30 through clutch 104 (Figure 5) which is normally held closed by its solenoid. Power is transmitted to apron 4 by the energization of the solenoids controlling the normally open clutch units 100 and 102. The operation of all of these solenoids is correlated with the operation of the remainder of the apparatus in a manner to be more fully pointed out below.

As shown in Figure 1, picker 34 is driven from below through a belt 150 by motor 152. Picker 46 and roller 48 are driven through belts 154 and 156, respectively, by motor 158 mounted upon a swinging platform 160. Platform 160 is pivotally mounted at its left end on a shaft 162 and is supported at its right end by a compression spring 164. Thus, belts 154 and 156 are held under tension by the weight of motor 158, but spring 164 prevents excessive strain upon the belts. Sieve-rollers 38 and 40 and feed rollers 44 are geared together and are driven through a clutch mechanism (not shown) from the shaft of picker 34. As will be explained below, this clutch mechanism is normally held engaged and drives the sieve-rollers except when its controlling solenoid is energized.

The details of construction of the mechanism for movably supporting the perforated cones and for providing suitable suction on the inside of the cones is shown best in Figures 6, 7, and 8. Figure 6 shows principally the mechanism for moving the cones into and out of the forming tower while Figures 7 and 8 show the details of the flipper mechanism for inverting the cones so that the bat may be removed.

Referring to the lower portion of Figure 6, the cone which is positioned within the forming tower is moved from and to the forming tower through a pair of vertically pivoted doors 201. The other cone is moved to and from the forming tower through a pair of similar doors 202. Doors 201 and 202 are mechanically connected to open and close together through a pair of segment wheels 203 (see also Figure 1) and suitable interconnected levers 204 and are normally held in closed position by two tension springs 209. An air cylinder unit 205 is connected through an air line 207 to a source of air supply, and when air is supplied to the air cylinder, the doors are opened. Later when the air pressure is released, the doors are reclosed by the tension springs.

In this embodiment, means is provided for moving two cones alternately into and out of the forming tower. Each cone is carried by a rotatable base 166 (Figure 1) which is mounted upon a circular frame 168. Mounted below circular frame 168 is a motor 169 which is provided with a gear at the upper end of its shaft cooperating with a ring gear upon the rotatable base 166. During the time that fur is being deposited upon the cone, and during the wetting operation, motor 169 rotates the cone so that fur will be evenly deposited upon the cone and so that the bat will be evenly wetted.

Referring to Figure 6, the wetting of the bats is accomplished by two rigidly mounted sprays 212 each of which is connected to a water supply 214 through a water valve 216. Water valve 216 is operated by an air-operated control unit 218 which is connected through an air line 220 to a controlled source of air pressure. Unit 218 includes a spring which normally holds the valve in closed position; but when air pressure is supplied to the unit through air line 220, the water valve 216 is opened.

Circular frame 168 is rigidly mounted upon the top of a suction pipe 170 (see Figure 1) which extends to a sealing ring 172 at the floor and is connected to a suction fan (not shown). The left hand movable end of suction pipe 170 is supported by a roller 174, and suction pipe 170 is adapted to swing about the sealing-ring at the floor. As shown in Figure 6, the two suction pipes, each carrying a cone and the cone-supporting structure, are swung with their respective rings 172 as centers to and from the forming tower. Each suction pipe moves through a predetermined arc at one end of which its cone is positioned within the forming tower, and at the other end of which the cone is positioned with its rotatable base interengaged with a hook member 176. Movement is imparted to each suction pipe by a clamp 178 which is connected through a link 180 to a crank arm 182. Crank arm 182 is rigidly mounted upon the upper end of a stud-shaft 184 and rigidly mounted upon the lower portion of the stud-shaft is a pinion 186 which cooperates with a rack 188. Rack 188 is provided with a cylinder and piston unit at each of its ends; there being a piston 190 and an air cylinder 194 at one end and a piston 192 and an air cylinder 196 at the other end. Air is alternately supplied through air lines 198 and 200 to air cylinders 194 and 196, respectively, with the result that rack 188 is moved back and forth. The distance of this movement and the size of pinion 186 are such that pinion 186 is rotated 180° during one complete movement of the rack.

With the various elements in the positions shown in Figure 6, air is supplied through air line 200 to air cylinder 196, and piston 192 is forced to the opposite end of the cylinder. During this movement, rack 188 moves to the other end of its path of movement, and pinion 186 rotates and swings crank arm 182 through an angle of 180°. This movement of crank arm 182 acting through links 180 and clamps 178 swings the two suction pipes clockwise about their respective pivotal centers. Thus, one cone is moved from the forming tower, and the other cone is moved into the forming tower.

The suction upon the cones is controlled by butterfly valves 206 in the suction pipes. Each butterfly valve is operated by an air-operated control unit 208 which is connected through an air line 210 to a controlled source of air. When a cone is positioned within the forming tower, its butterfly valve is wide open, as shown at the bottom of Figure 6. When the bat is being wetted, the suction is gradually reduced by moving the butterfly valve to the intermediate position shown at the top of Figure 6 and then to the fully closed position. This movement of the butterfly valve is slow enough to permit a reduced pressure to remain upon the cone until water has been drawn through the bat to thoroughly wet the bat. However, by the time the water has been drawn through the bat, the butterfly valve is completely closed and remains closed until the cone is again positioned within the forming tower.

As indicated above, when the cone is moved to the wetting position, the base of the cone is moved into a hook member 176 (see Figures 7 and 8) which fits an annular groove 222 in the cone base. As shown best in Figure 8, hook 176 comprises a main hook member 224 and a latching member 226 which is swingably mounted on a pivot 228 and is biased to the position shown by leaf-spring 230. Thus, the cone base may be positioned into the hook member, and, in this process, latch member 226 is displaced against the tension of leaf-spring 230.

After the cone member is positioned within the hook, it is securely clasped in position as shown in Figure 7. Hook 176 is mounted upon an arm 231 which is rigidly mounted with respect to a pinion 232 upon an axle 234 which, in turn, is carried by the two arms 236 (Figure 8) of an inverted yoke, generally indicated at 238 (Figure 7). Yoke 238 is slidably mounted upon a vertical standard 240, and, at each side, the yoke is provided with an integral flange 244 (Figure 8) having a vertical groove 245 therein which snugly receives a flange 246 on the vertical standard. Mounted upon the left side of standard 240 is a vertically extending rack 242, the teeth of which mesh with the teeth of pinion 232. Yoke 238 carries a downwardly extending piston rod 248 which extends into a vertical air cylinder 250 and carries an air piston 252. At the bottom, cylinder 250 is connected to an air line 254, and when air is supplied to the cylinder, piston 252 moves to the upper end of the cylinder, and this movement is transmitted through piston rod 248 to yoke 238. During the upward movement of yoke 238, pinion 232 meshing with rack 242 rotates with respect to the yoke and in this rotation carries arm 231 and hook 176 with it. During the upward movement of the piston and the yoke, pinion 232 and arm 231 rotate 180°, and the elements move to the position shown in broken lines (Figure 7).

Upon each of the extreme ends of axle 234 is rigidly mounted an arm 256 which carries an adjustable counterweight 258. These counterweights swing about axle 234 as arm 231 swings upwardly, and counterbalance the weight of the arm and the cone. When the elements have been moved to the broken-line position, they remain stationary for a short period of time during which the bat is peeled or stripped from the cone. The air pressure is then turned off in air line 254, and as the air is exhausted from air cylinder 250, the mechanism settles back to the position shown in full lines.

The electrical control circuit together with certain of the operating solenoids and certain portions of the air pressure system is shown in Figure 9. As pointed out above, this control circuit comprises a timed mechanism which co-operates with a number of mechanically operated switches to produce a unified control for the entire fur supply and bat forming mechanism. This control correlates the action of: the means to move fur from the fur supply hopper to the weighing mechanism; the means to accurately weigh the fur into predetermined quantities; the means to separate the fur and convey it to the bat forming tower; the means to move the perforated cones to and from the bat forming tower where they have bats formed thereon; the suction and bat wetting means associated with each of the perforated cones; and the cone flipper or inverting means for each of the cones. The control is such that the mechanism will continuously produce bats if it is permitted to operate without interruption, but the operator can stop the operation at any time, and when the mechanism is again started, no difficulty is encountered as a result of the stopping. This last feature of permitting the operator to stop the operation is important in providing a practical working machine.

As has been indicated above, in the present embodiment, two cones are alternately positioned within the forming tower, and, as fur is being deposited on one cone to form a bat, the bat upon the other cone is being wetted and stripped from the cone. Fur is supplied to these two cones in a single forming tower from a single weighing, conveying, and fur separating unit.

Accordingly, the control mechanism, diagrammatically shown in Figure 9, causes the fur conveying and separating and fur weighing mechanisms to operate continuously to supply the fur to the forming tower in separate quantities each of which is sufficient to form a bat; and alternate ones of these quantities of fur are delivered to each of the cones. Thus, the sequence of operation for the weighing, conveying, and separating mechanism and for the forming tower mechanism is repeated for each bat which is formed.

However, while the same steps are performed by the mechanism individual to each of the cones, each cone is handled separately, and a complete cycle of operation for the mechanism associated with the cones is completed during the forming of two bats. Therefore, the control circuit is such that one portion of it completes a cycle of operation during a predetermined period of time while the other portion of the circuit completes its cycle of operation during two of these periods.

The apparatus is so controlled that a complete quantity of fur is being weighed and delivered to the conveyor during the time that a previously weighed quantity of fur is being deposited upon a cone. Provision is made for the operator to stop the automatic operation of any portion of the apparatus, and he can continue the manual control of the apparatus or he can make the automatic control operative again without danger of interfering with any of the steps of the operation.

Referring to the left hand portion of Figure 9, the mechanism individually associated with each of the cones is controlled by a double gang-switch 320 having two identical sets or gangs of switches. The switches of each gang are mechanically interconnected so that they operate together, and they normally remain in the open-switch position. Each gang of switches is provided with a solenoid which is energized to close the switches of that gang. When one gang of switches is closed, circuits are completed controlling the suction upon the cone in the forming tower, the wetting and inverting of the cone outside of the tower, and the mechanism which moves the cones to and from the tower. When the other gang of switches is closed, similar circuits are completed which cause the same operations to be carried on.

In the present description, where the two cones are provided with separate but identical sets of operating mechanisms, the identical parts are given the same number, but the elements of one set have the suffix—1, and the elements of the other set have the suffix—2.

Current is supplied to the control system from a 220-volt, 60-cycle source having busses 326 and 328. The operating solenoids for the two sides of gang-switch 320 are designated as 330—1 and 330—2, respectively; one side of each solenoid is connected to a lead 332 which in turn is connected through a lead 334 to bus 328. The other side of solenoids 330—1 and 330—2 are connected, respectively, to terminals 336—1 and 336—2 of a switch 322; when armature 324 of switch 322 is in the position shown, terminal 336—1 is connected to a terminal 338—1 and when the armature is in the reversed position, terminal 336—2 is connected to a terminal 338—2. Terminals 338—1 and 338—2 are both connected through a lead 340 extending to the right to a lead 342 which extends downwardly to a terminal 344 of a switch 346. The movable armature 348 of switch 346 is connected throug an upwardly extending lead 350 to bus 326. Thus, with switches 346 and 322 positioned, as shown, the potential of bus 326 is carried through lead 350, switch 346, leads 342 and 340, and switch 322 to solenoid 330—1.

In this manner, the full voltage between busses 326 and 328 is impressed across solenoid 330—1 and the armature 352—1 is held upwardly with the gang of switches at the left closed. The closing of switch 354—1 completes an interlock circuit from bus 326 through lead 356 and lead 358 to lead 340. Thus, as will be explained below, even though switch 346 is reversed, solenoid 330—1 remains energized until armature 324 of switch 322 is reversed; armature 324 is mechanically connected to rack 188 (Figure 6) and is reversed at the end of each movement of the rack. Thus, armature 324 (Figure 9) remains in the position shown until the cones are moved to the reversed position; at this time, the switch is reversed with the result that solenoid 330—1 is deenergized and solenoid 330—2 is energized.

As pointed out above in connection with Figure 6, the cones are swung to and from the forming tower by alternately supplying air to transfer cylinders 194 and 196. Air is supplied to cylinder 196 through air line 200, and this supply of air is controlled by a normally closed valve (not shown). This valve is turned to its position to supply air to air line 200 by the energization of a control solenoid unit shown at the left of Figure 9 and designated 366—1. One side of unit 366—1 is connected directly to bus 328 by a lead 368—1. The other side of unit 366—1 is connected through a lead 364—1, a normally closed manual switch 362—1, a lead 361—1, and a switch 360—1 and through lead 370 to a terminal 372 of switch 346.

Armature 348 of switch 346 is mechanically connected to the door operating mechanism 203 of the forming tower and when the doors are closed, this armature is in the position shown. However, when the doors are opened, armature 348 is moved to the left and contacts terminal 372. As indicated above, armature 348 of switch 346 is connected through lead 350 to bus 326, and when switch 346 is reversed from the position shown, the potential of bus 326 is carried along lead 350 through switch 346 through lead 370, switch 360—1, lead 361—1, switch 362—1, and lead 364—1 to solenoid unit 366—1. Thus, with the elements in the position shown, switch 360—1 is closed, and when the bat has been removed from the cone outside the tower, and a new bat has been formed upon the cone inside the tower, the forming tower doors are opened and switch 346 is moved to the reversed position, and the full voltage between busses 326 and 328 is impressed across the solenoid unit 366—1. This operates the air control valve and supplies air through air line 200 to transfer cylinder 196, and the cones are transferred in the manner outlined above.

The automatic control circuit for solenoid unit 366—1 may be disconnected by moving switch 362—1 to the center vertical position. The solenoid unit may then be energized by moving switch 362—1 to the left against contact 374—1 which is directly connected through a lead 376—1 to bus 326.

When a bat is removed from the forming tower it is sprayed, and during the early part of this spraying process, it is important that sufficient suction be maintained upon the inside of the cone to draw the water through the bat so that the bat is thoroughly wetted. During the latter period of the spraying process, the suction is cut off so that the water will not be drawn into the suction blower.

As pointed out above, the control of the water to the spray is maintained by a valve control unit 218 (Figure 6) which opens the water valve 216 when air is supplied through air line 220. The supply of air to air line 220 is controlled by a spray solenoid unit 380—1 (Figure 9) which when energized, opens the air valve, and when deenergized, closes the air valve and opens the air line to exhaust. One side of control unit 380—1 is connected through a lead 382—1 directly to bus 328; the other side of the control unit is connected through lead 384—1, switch 386—1, and lead 388 to terminal 390 of a switch generally indicated at 392.

With switch 392 in the position shown, its armature 394 contacts terminal 390 and connects it through lead 396 to terminal 398 of switch 346. Armature 348 of switch 346 is directly connected through lead 350 to bus 326. Thus, with the switches in the position shown, the full potential between busses 326 and 328 is impressed across spray control unit 380—1, and water is supplied to spray nozzle 212. Switch 392 is shown in the position which it occupies when its solenoid 400 is energized, and, thus, the circuit controlling the spray is completed only while the proper potential is supplied to this solenoid. One side of solenoid 400 is connected directly by lead 402 to bus 328, and the other side is connected through lead 404, a terminal 406 and armature 412 of a time-delay switch, generally indicated at 408, a lead 411, and lead 350 to bus 326. Time-delay switch 408 is provided with a solenoid 410 which when energized tends to open the switch. However, armature 412 of the switch has connected thereto a time-delay unit, diagrammatically shown at the top of the switch, and indicated at 414; when solenoid 410 is energized, time-delay unit 414 is effective to cause a time delay of approximately eight seconds before the armature is moved to open the switch. When the switch is in open position, armature 412 moves to the switch-closing position immediately upon the deenergization of solenoid 410.

Solenoid 410 is connected to the circuit which energizes the operating solenoids 330—1 and 330—2 of double-gang switch 320. Accordingly, one side of solenoid 410 is connected through a lead 416 to lead 334, and the other side of the solenoid is connected through a lead 418 to lead 342. Thus, the potential of bus 328 is impressed upon one side of the solenoid through leads 334 and 416, and when switch 346 is in the position shown, the potential of bus 326 is impressed upon the other side of solenoid 410 through lead 350, switch 346, lead 342, and lead 418. In this manner, solenoid 410 is energized at the time that one of the solenoids 330—1 and 330—2 is energized, and the spraying of the bat is started. The spraying is continued for a period of eight seconds after which time armature 412 of switch 408 moves upwardly to open the switch deenergizing solenoid 400. The deenergization of solenoid 400 permits armature 394 to move to its lower position away from terminal 390, and the circuit is broken to the spray control unit 380—1.

As pointed out above, full suction is maintained upon the cone while a bat is being formed thereon and while the cone is being moved from the forming tower, and this suction is continued during a portion of the wetting period. Referring to Figure 6, the suction in each of the suction pipes is controlled by a butterfly valve 206 which is operated by a suction control unit 208 which opens the butterfly valve when air is supplied thereto through its air line 210. The supply of air to the two air lines 210 is controlled by the circuit shown in the lower left hand portion of Figure 9, there being two suction-control solenoid units 420—1 and 420—2, and two switches generally indicated at 422—1 and 422—2. Units 420—1 and 420—2 are connected at one side through leads 424—1 and 424—2, respectively, to bus 328, and at the other side through switches 428—1 and 428—2, respectively, and lead 432 to bus 326. Thus, with the armatures 434—1 and 434—2 of switches 422—1 and 422—2 in the upper closed position, both of the suction control solenoid units 420—1 and 420—2 are energized, and suction is maintained upon both cones. Hereinafter, when referring to the machine with reference to the positions of the elements a sindicated in Figure 9, the cone which is outside the forming tower is referred to as "cone one," and the suction upon it is controlled by suction-control solenoid unit 420—1. The cone in the forming tower at this time is referred to as "cone two," and the suction upon it is controlled by suction-control solenoid unit 420—2.

Armatures 434—1 and 434—2 are individually held in the switch closing position by the energization of the solenoids 436—1 and 436—2, respectively, and when the circuit is broken to one of these solenoids, the corresponding switch is opened and the suction to its cone is shut off. When a bat is being sprayed, it is important that the suction be accurately timed with respect to the spraying operation, and that the suction be cut off when the water has penetrated the entire bat. In the present embodiment, suction is established upon the cone within the forming tower by the closing of one gang of the switches of switch 320; and after the cone is removed from the forming tower, an interlock is maintained upon the suction circuit, and this interlock is broken after a predetermined period by a time-delay switch.

Thus, one side of each of solenoids 436—1 and 436—2 is connected through a lead 448 directly to bus 328. Each of the solenoids is connected at the other side through one of two identical circuits one of which is closed by the closing of one gang of switch 320. However, the gang of switches which controls the operations of spraying, inverting, etc., on cone one, the cone outside the forming tower, simultaneously controls the suction upon cone two, the cone in the forming tower. Accordingly, solenoid 436—2, which controls suction-control solenoid unit 420—1 and thus the suction on cone one, is connected through a lead 442—1 extending upwardly and to the left to a switch 444—1 the other side of which is connected through a lead 446 directly to bus 326. At the point of connection with lead 442—1, solenoid 436—2 is connected through a downwardly extending lead 450—2 to an interlock switch 452—2, the other side of which is connected through a lead 454—1 to a terminal 456—2 of a time-delay switch, generally indicated at 438. Armature 458 of switch 438 is connected through a lead 460 to bus 326, and when switch 438 is closed, solenoid 436—2 remains energized and suction is maintained upon the cone even though switch 444—1 is open.

Switch 438 is similar to switch 408 but is adjusted to open four seconds after its solenoid 462 is energized. Solenoid 462 is energized by the movement of armature 348 of switch 346 to the right at the time the doors are closed, and the interlock circuit for solenoid 436—1 remains closed and suction-control solenoid unit 420—1 remains energized with the result that suction is maintained upon cone one for four seconds after the spraying operation starts. This is sufficient time for the water to penetrate the bat and the suction is shut off though the spraying continues. One side of the solenoid 462 is connected directly through a lead 464 to bus 328, and the other side of the solenoid is connected through a lead 466 to terminal 398 of switch 346; when switch 346 is in the position shown, solenoid 462 is connected through lead 350 to bus 326. Time-delay switch 438 is so arranged that there is a time delay only in the opening of the switch, and the switch closes immediately upon the deenergization of the solenoid.

It will thus be seen that the closing of one of the gangs of switches such as switches 360—1, 478—1 and 444—1, provides for the spraying of the bat and the removal thereof from the outside cone, designated "cone one," and maintains a continuous suction upon the inside cone, designated "cone two," by energizing solenoid 436—2 so that suction control solenoid unit 420—2 is energized. Later, when a bat has been formed upon "cone two" and the bat has been removed from "cone one," the forming tower doors are opened, the cones are moved by the transfer mechanism, and the gang of switches including switch 444—1 are opened. However, prior to the opening of switch 444—1, the opening of the doors moves armature 348 of switch 346 to the left away from contact 398 with the result that solenoid 462 is deenergized and switch 438 is immediately closed by the falling of its armature 458. This completes an interlock circuit from bus 326 and through lead 460, switch 438, lead 454—1, switch 452—2 and lead 450—2 to solenoid 436—2. Thus, when "cone two" is moved from the tower, solenoid 436—2 remains energized due to the interlock circuit, and switch 428—2 is held closed and solenoid 420—2 remains energized so that suction is maintained upon "cone two."

When the forming tower doors are reclosed, armature 348 of switch 346 is moved into contact with terminal 398 to again energize solenoid 462, and this starts the timing operation which occurs upon the opening of the time-delay switch 438. Thus, at a predetermined time after the closing of the doors, switch 438 opens to thereby break the interlock circuit through lead 454—1, switch 452—2 and lead 450—2 to solenoid 436—2, and the suction upon "cone two," which is now outside the forming tower, is cut off. In this manner, accurate and reliable control is maintained upon the suction so that the suction is discontinued at the proper time with respect to the After the spraying operation has been completed, the outside cone is automatically inverted so that the bat may be stripped therefrom. As pointed out in connection with Figures 7 and 8, this inverting operation is accomplished by supplying air to a vertical cylinder 250 through an air line 254. The supply of air to air line 254 is controlled by a flipper-control solenoid unit 468—1 (Figure 9) having one side connected directly to bus 328 by lead 470—1, and the other side connected through a lead 472—1, a manual switch 474—1, and a lead 476—1 to switch 478—1. The other side of switch 478—1 is connected through a lead 480 extending to the right and downwardly to terminal 482 of a mechanical-interlock switch, generally indicated at 484.

Armature 486 of switch 404 is moved to its upper position by the energization of solenoid 485 which has one side connected directly to bus 328 through leads 498 and 500. The other side of solenoid 485 is connected through an upwardly extending lead 502 to terminal 504 of switch 408 which is connected through armature 412 and leads 411 and 350 to bus 326. When armature 486 is in its upper position, it is held there by a mechanical latch 506 and thus remains in this position even though solenoid 485 is deenergized. At a later time, latch 506 is released by the energization of solenoid 530 in a manner pointed out below.

When in the upper position shown, armature 486 of switch 484 bridges terminals 482 and 488; terminal 488 is connected through a lead 490 to a terminal 492 of switch 392. Terminal 492 is positioned to be contacted by armature 394 when the armature is in its lower position, and armature 394 is connected through lead 396, switch 346, and lead 350 to bus 326. As pointed out above, armature 394 moves from the upper position shown to its lower position to stop the spraying operation; this movement of the armature occurs when solenoid 400 is deenergized. Thus, the movement of armature 394 which stops the spraying operation also completes the circuit to supply air to the cone-inverting or flipper mechanism. This circuit extends from bus 326 through lead 350, switch 346, lead 396, switch 392, lead 490, switch 484, lead 480, switch 478—1, lead 476—1, switch 474—1, and lead 472—1 to solenoid unit 468—1. This opens the air valve to supply air to line 254 (Figure 7) whereupon, piston 252 moves upwardly and carries the elements to the broken line position in the manner pointed out above.

The cone is maintained in this position for sufficient time for the bat to be removed, and, in the present embodiment, this time delay is obtained by providing a pressure control mechanism which depends for its operation upon the pressure in air line 254. Referring to Figure 9, the lower central portion of this control mechanism includes two snap-acting pressure switches 508—1 and 508—2; the pressure responsive member of each of these switches is connected to one of the air lines 254. These two switches are connected in series with switch 508—1 connected through a lead 510 to bus 326, and switch 508—2 connected through a lead 512 to a solenoid 514, the other side of solenoid 514 is connected through a lead 516 to bus 328. Thus, when switches 508—1 and 508—2 are both closed, solenoid 514 is connected directly across busses 326 and 328, and armature 518 of switch 520 is maintained in its upper position. Pressure switches 508—1 and 508—2 are so adjusted that they normally remain closed, but they open when the pressure in their respective lines reaches the value of seventy pounds per square inch.

Under normal conditions of operation, as air is supplied to line 254 (Figure 7), piston 252 moves upwardly without the pressure in line 254 reaching the value of seventy pounds per square inch. However, after the cone has been moved to the stripping position (shown in broken lines), air continues to flow into air line 254 and cylinder 250, and the pressure gradually rises. After a predetermined period of time which can be regulated, switch 508—1 (Figure 9) snaps to the open position, solenoid 514 is deenergized, and armature 518 drops across terminals 522 and 524. Terminal 524 is connected directly to bus 326 by lead 526, and terminal 522 is connected through a lead 528 to one side of latch-releasing solenoid 530, the other side of which is connected through leads 532, 498, and 500 to bus 328.

Thus, the deenergizing of solenoid 514 closes the circuit of solenoid 530, and solenoid 530 swings latch 506 to the left and releases armature 486. As pointed out above, the circuit of solenoid 485 has been previously opened by the opening of switch 408, and when latch 506 moves to the left, armature 486 moves to its lower position. This opens the connection between terminals 482 and 488, and, as a result, opens the circuit outlined above connecting the flipper-control solenoid unit 468—1 to bus 326. This shuts off the air to air line 254 (Figure 7), and as the air escapes, the elements of the flipper or cone-inverting mechanism are moved by gravity back to the position shown in full lines. Pressure switch 508—1 is set to reclose at substantially atmospheric pressure, and, thus, when the flipper mechanism has returned to its normal position, and the air pressure in air line 254 has reached atmospheric pressure, switch 508—1 closes again energizing solenoid 514 and moving armature 518 to the position shown. This deenergizes solenoid 530 and frees latch 506 so that it will hold armature 486 in the upper position during the next cycle of operations.

If the operator wishes to hold the cone in the bat-stripping position or if he wishes to move the cone to this position when the normal circuit of solenoid unit 468—1 is open, he may do so by moving the armature of switch 474—1 to the left into contact with terminal 473—1. This connects solenoid unit 468—1 directly to bus 326 through lead 475—1 and maintains air pressure in air line 254 regardless of the condition of the remainder of the circuit.

As has been pointed out above, apron 4 (Figure 1) is rotated at a rapid rate during the major portion of the time necessary to deliver a quantity of fur to hopper 20. However, as the amount of fur in the hopper approaches the proper weight, the speed of apron 4 is slowed down and accurate and dependable weighing is accomplished. In connection with Figure 5, it was explained that the apron clutches 100 and 102 are controlled by solenoid units; these units are shown in the lower right-hand portion of Figure 9, solenoid unit 536 being the one which controls clutch 102, and solenoid unit 538 being the one that controls clutch 100.

Solenoid units 536 and 538 are connected upon one side to bus 328 through leads 540 and 542, respectively. The other sides of these solenoid units are connected to a speed-control switch, generally indicated at 544; solenoid unit 536 is connected by a lead 546 to terminal 548, and solenoid unit 538 is connected by lead 550 to terminal 552. Switch 544 is provided with an armature 554 which alternatively contacts terminals 548 and 552 and which is connected through a lead 570 to a terminal 572 of a switch, generally indicated at 574. With the armature 576 of switch 574 in the position shown, terminal 572 is connected through its corresponding terminal 578, a lead 580, and a downwardly extending lead 582 to bus 326. Thus, the potential of bus 326 is carried to armature 554 of switch 544 and is impressed upon one of the solenoid units 536 or 538 to drive apron 4 at fast or slow speed depending upon the position of armature 554.

Armature 554 is held in its upper position, as shown, by the energization of a solenoid 556, one side of which is directly connected to bus 328 by a lead 558, and the other side of which is connected through a lead 560, mercury switch 562 and a lead 564 to bus 326. Mercury switch 562 comprises two pools of mercury 566 which are normally connected by an inverted U-shaped movable armature 568. Armature 568 is mounted upon the balance arm of the scale mechanism, and this balance arm remains stationary until the major portion of a quantity of fur is delivered to the scale hopper. However, as the amount of fur within the hopper approaches the desired quantity, the scale arm starts to move, and upon the first movement, armature 568 moves out of mercury pools 566 and solenoid 556 is deenergized. The deenergization of solenoid 556 permits armature 554 to move to its lower position thereby deenergizing the fast-speed solenoid unit 536, and energizing the slow-feed solenoid unit 538. Thus, the speed of apron 4 (Figure 1) is reduced to an extent that the fur merely drizzles into hopper 20, and the amount of fur within the hopper slowly approaches the exact quantity desired.

When the exact quantity of fur has been placed in the hopper, the scale arm tips slowly to the balanced position, and when in this position intercepts the light beam of spot light 17 which is normally directed against photo-electric cell unit 19. The interception of this light beam energizes a relay solenoid 583 which closes switch 584. One side of switch 584 is connected through a lead 586 and lead 582 directly to bus 326, and the other side is connected through a lead 588 to solenoid 590 controlling armature 576 of switch 574; the other side of solenoid 590 is connected to bus 328 by a lead 592. Thus, the closing of switch 584 energizes solenoid 590 with the result that armature 576 of switch 574 is moved to its upper position, and the electrical connection between contacts 578 and 572 is broken. The breaking of this connection opens the circuit to the armature of switch 544, and the slow-feed solenoid unit is deenergized stopping the apron.

In moving to its upper position, armature 576 bridges a pair of terminals 594 and 596; terminal 594 is connected through lead 582 to bus 326, and terminal 596 is connected through a lead 598 to one side of a baffle-control solenoid unit 600. The other side of solenoid unit 600 is connected directly to bus 328 through a lead 602, and, thus, when terminals 594 and 596 are bridged by armature 576, the full voltage between busses 326 and 328 is impressed across solenoid unit 600. When solenoid unit 600 is energized, it moves baffle 26 (Figure 1) to the broken-line position so that fur does not enter the top of scale hopper 20. In this manner, at the time the exact quantity of fur has been delivered to hopper 20, the photoelectric cell unit 19 is effective to cause armature 576 to move upwardly, and this movement immediately stops the feed of fur to the scale hopper and moves baffle 26 to deflect the falling fur from the top of the hopper. This insures speedy but accurate weighing of the successive quantities of fur and avoids short weight and overweight bats.

The timing apparatus which normally completes a cycle while one quantity of fur is being weighed and another quantity of fur is being deposited upon a cone is shown at the upper right-hand portion of Figure 9 and is indicated generally at 609. This timing apparatus comprises a constant speed motor 610 connected through a speed reduction mechanism to a shaft 612 carrying six cams. Each of these cams is positioned to engage and close a normally open switch for a predetermined period of time at a particular point in the cycle of operation; the cams are designated 622, 624, 626, 628, 630, and 632, and they operate switches 634, 636, 638, 640, 642, and 644, respectively.

At the left of motor 610, upon a shaft 615 is mounted a brake 614 which prevents rotation of the motor except when the brake solenoid 616 is energized. Solenoid 616 is connected across the input leads 618 and 620 of motor 610 and is energized to release the brake when the motor is started. Shaft 612 rotates at the rate of one revolution every twenty-seven seconds, and the various switches are opened and closed by their respective cams for varying portions of this time to complete a cycle in a manner pointed out below. It should be noted, however, that the period of time necessary to complete the steps which occur during one cycle depends upon the conditions under which the apparatus is used; and particularly upon the length of time necessary to deposit a single quantity of fur upon a cone in the forming tower and the length of time necessary to weigh a quantity of fur. Accordingly, the rate of rotation of shaft 612 and the contours of the various cams are varied depending upon the conditions of usage.

When the desired weight of fur is deposited in hopper 20 (Figure 1), apron 4 is stopped and baffle 26 is moved to its broken-line position to deflect fur from the top of the hopper. Simultaneously, the bottom-dumping mechanism of the hopper is opened so that the fur falls upon endless belt 24. The bottom-dumping mechanism is held closed by a latch (not shown) and this latch is released by the energization of a scale-opening solenoid 646. One side of solenoid 646 is connected through lead 648 and a switch 650 to bus 328; the other side is connected through lead 652, switch 654, lead 656, switch 640, leads 658 and 660, switch 662 and lead 664 to bus 326. Switch 654 is a portion of switch 574 and is normally closed at this point in the cycle of operations by the lifting of armature 576. Switch 662 is normally held in the closed position by a solenoid 666 which is connected on one side through leads 668 and 670 to bus 328 and upon the other side through a lead 672, a manual switch 674, a lead 676, and lead 664 to bus 326. Thus, the momentary closing of switch 640 by cam 628 completes the circuit from bus 326 through lead 664, switch 662, lead 660, lead 658, switch 640, lead 656, switch 654, and lead 652 to solenoid 646. The energization of solenoid 646 releases the latch holding the bottom-dumping mechanism closed, and the fur is dumped from the bottom of the hopper.

As explained above, armature 576 is moved to its upper position when relay solenoid 583 closes switch 584 and solenoid 590 is energized. If switch 584 has not been closed by the action of the photo-electric cell relay, switch unit 654 remains open; therefore, the closing of switch 640 does not complete the circuit to solenoid unit 646, and the bottom of the hopper remains closed. This prevents the dumping of underweight quantities of fur.

After the opening of the bottom of the hopper, it is important that baffle 26 be held in its raised position (broken-line position of Figure 1) to deflect fur from the top of the hopper, and that the feed mechanism remain stationary until the hopper is closed again. Accordingly, simultaneously with the closing of switch 640, cam 632 closes its switch 644 and completes an interlock circuit around switch 584 which maintains solenoid 590 energized even though switch 584 is opened. This interlock circuit extends through terminal 594, armature 576, terminal 596, leads 598 and 678, switch 644, and lead 680. If armature 576 is not in its upper position at the time switch 644 is closed, this interlock circuit is not completed, and the closing of switch 644 has no effect.

After the bottom-dumping mechanism of the hopper has been opened, and the fur falls on endless belt 24, it is closed again by the energization of scale-closing solenoid unit 682. One side of solenoid unit 682 is connected through lead 648 and switch 650 to bus 328, and the other side is connected through lead 684, switch 642, and lead 686 to lead 658, and, thus, through lead 660, switch 662 and lead 664 to bus 326. Accordingly, at an interval of three seconds after the closing of switch 640, cam 630 engages and momentarily closes switch 642, and solenoid unit 682 is energized closing the hopper. Simultaneously, cam 632 disengages switch 644, and the switch opens breaking the interlock circuit through leads 678 and 680 to solenoid 590. There being no fur in the hopper, the scale arm is in its lower position, and the light beam again plays upon the photo-electric cell with the result that switch 584 is open. Accordingly, the opening of the interlock circuit through switch 644 deenergizes solenoid 590, and armature 576 moves to its lower position. This breaks the connection between terminals 594 and 596 and deenergizes solenoid unit 600 so that baffle 26 moves to its vertical position. The movement of armature 576 to its lower position causes it to bridge contacts 578 and 572, and the circuit from bus 326 through leads 582 and 580, switch 574, and lead 570 to switch 544 is reestablished. Armature 568 of mercury switch 562 is in mercury pools 566, and solenoid 556 is again energized so that armature 554 is in its upper position. Thus, the circuit from bus 326 through switch 544 is connected to the fast-speed solenoid unit 536, and fur is delivered to the hopper again at a rapid rate. The operation of the bottom-dumping mechanism of the hopper may be stopped at any time by opening switch 650.

As pointed out above, sieve-rollers 38 and 40 are stopped just prior to the opening of the forming tower doors, and a layer of fur is accumulated upon each of the sieve-rollers. When a new cone has been placed in the forming tower, the sieve-rollers are started again, and this accumulated fur is deposited upon the cone. The clutch driving the sieve-rollers is normally held engaged by a spring, but a solenoid unit 690 is provided which is energized to disengage the clutch and stop the sieve-rollers. Solenoid unit 690 has one side connected through leads 692 and 694 and 696 to bus 328; the other side is connected through a lead 698 to switch 638 which is engaged and closed by cam 626. The other side of switch 638 is connected through leads 700 and 702 to a terminal 704 of switch 392 which is connected by armature 706, leads 708 and 660, switch 662, and lead 664 to bus 326.

Armature 706 is mechanically connected to move with armature 394, and, thus, is held in the upper position when solenoid 400 is energized, but at this point in the cycle of operations, the solenoid is normally deenergized, and the armature is in the lower position. Accordingly, the closing of switch 638 energizes solenoid unit 690, and the sieve-rollers are stopped. Cam 626 holds switch 638 closed until a new cone is positioned in the forming tower at which time switch 638 opens and the sieve-rollers start again. However, even though switch 638 does not open, this circuit is broken by the lifting of armature 706 when solenoid 400 is energized at the time a cone has been positioned in the forming tower. Thus, the sieve-rollers are started, and fur is delivered to the cone at the time the cone is properly positioned.

The doors to the forming tower are opened simultaneously by supplying air to air line 207 (Figure 6) which occurs upon the energization of a solenoid unit 710 (Figure 9) which has one side connected directly to bus 328 through leads 712 and 500. The other side is connected to bus 326 through a manual switch 714, lead 716, a switch unit 717 of switch 484, a switch unit 519 of switch 520, lead 726, switch 634, leads 728 and 702, terminal 704, armature 706, leads 708 and 660, switch 662, and lead 664. Switch 717 is formed by two terminals 718 and 720 which are positioned to be bridged by armature 486 when the armature is in the lower position. Switch 717 is, therefore, open when armature 486 is held in its upper position by solenoid 485 or latch 506. Latch 506 engages armature 486 at the time a cone with a bat thereon is moved from the forming tower, and the armature is released to close switch unit 717 only when the cone is moved to the bat stripping position. Switch unit 519 is formed by a pair of terminals 722 and 724 which are positioned to be bridged by armature 518 when the armature is in its upper position. Switch unit 519 is open when solenoid 514 is deenergized by the opening of one of switches 508—1 or 508—2, and, thus, this switch unit is open during the time that the bat is being stripped from the cone and remains open until the cone is returned to its rotatable base.

Thus, at a predeterminate time in the cycle of timing mechanism 609, cam 622 engages and closes switch 634, and the forming tower doors are opened if the following has occurred: The wetting operation has been completed with the result that solenoid 400 of switch 392 is deenergized, and armature 706 is in its lower position. If armature 486 of switch 484 has returned to its lower position due to the disengagement therewith of latch member 506 as occurs when solenoid 630 is energized by the moving of armature 518 downwardly when the cone has been inverted, and if there is no pressure in the air lines 254 indicating that the inverting operation has been completed upon the cone which is outside the forming tower, and made apparent by the fact that both of the switches 508—1 and 508—2 are closed and armature 518 of switch 520 is held in its upper position by the energization of solenoid 514. In this manner, the doors are not opened until the spraying operation has been performed, and the cone has been inverted and returned to its position at the side of the forming tower; this single control circuit is operative regardless of which of the cones is outside of the forming tower.

As pointed out above, it is important that the timed operations including the operations of the weighing and conveying mechanism be accurately controlled with respect to the mechanically controlled operation of the bat former and the mechanism for wetting and removing the bats from the cones. Therefore, provision is made for the automatic stopping of the operations of weighing, conveying, etc., if these operations are completed before the remaining apparatus has completed its sequence of operations. Accordingly, motor 610 of the timing unit 609 is supplied with power through a circuit which is under the control of an interlocking circuit; this interlocking circuit prevents the starting of a new cycle of operations by the timing unit if the entire apparatus has not completed the previous cycle of operations. One side of motor 610 is connected through leads 618, 750, and 696 to bus 328; the other side is connected through leads 620 and 748, switch unit 744 of switch 740, and leads 746 and 582 to bus 326.

Switch unit 744 is normally closed, and motor 610 is, therefore, energized as armature 742 is normally in its lower position; armature 742 is raised to its upper position to open the switch and stop the motor when solenoid 752 is energized. Solenoid 752 has one side connected through leads 694 and 696 to bus 328, and the other side is connected to bus 326 through lead 754, switch 636, lead 756, terminal 492, and armature 394 of switch 392, lead 396, switch 346, and lead 350. At the end of each cycle of operations switch 636 is closed by cam 624, and at this point in the cycle, armature 394 of switch 392 is in its lower position contacting terminal 492. If armature 348 of switch 346 is in contact with terminal 398, the closing of switch 636 energizes solenoid 752, and motor 610 is stopped.

However, when the apparatus is operated normally, the doors to the forming tower are open at the point in the cycle of operations where switch 636 is closed, and when the doors are open, armature 348 is in its left-hand position out of contact with terminal 398. Thus, under normal conditions, the circuit through solenoid 752 is open at switch 346 when switch 636 is closed, and the solenoid is not energized. As has been pointed out above, the forming tower doors are not open until the bat wetting and removing operations are completed, and the cone has been positioned at the side of the forming tower. Thus, if there has been a delay in the wetting or removing of the bat or if the cone is not positioned to be moved into the forming tower, the doors remain closed, and the cycling unit 609 does not start a new cycle of operation. If such a delay has occurred, motor 610 remains stationary until the previous cycle is completed, and the doors are opened; the opening of the doors breaks the circuit of solenoid 752, and timing unit 609 starts a new cycle. In this manner, the weighing and conveying mechanism operates through a predetermined timed cycle every time a bat is formed, and this timed cycle is interlocked with the mechanically controlled cycle of the bat former and bat removing mechanism.

As has been indicated above, endless belt 24 and feed rollers 30 are driven through clutch 104; clutch 104 is normally held closed by the energization of a solenoid 730. One side of solenoid 730 is connected through lead 670 to bus 328, and the other side is connected through leads 732 and 734, switch unit 736, lead 738, switch 662, and lead 664 to bus 326. Switch unit 736 is a portion of switch 740 and opens and closes with switch unit 744. Thus, when timing unit 609 is stopped, solenoid 730 is deenergized, and the movement of fur is stopped by the stopping of endless belt 24 and feed rollers 30. When it is desirable to operate endless belt 24 and feed rollers 30 to bring a batch of fur to picker 34 without operating the remainder of the apparatus, switch 674 is moved to the right into contact with its terminal 675. This completes a circuit from bus 326 through lead 664, lead 676, switch 674, lead 732 to the solenoid 730.

As many possible embodiments may be made of the mechanical features of the above invention and as the art herein described might be varied in various parts, all without departing from the scope of the invention, it is to be understood that all matter hereinabove set forth, or shown in the accompanying drawings is to be interpreted as illustrative and not in a limiting sense.

I claim:

1. In hat making apparatus, the combination of, a plurality of cones, means to form bats upon said cones, a multiple-unit gang-switch having a gang of switches corresponding to each of said cones, a master switch to successively energize the various gangs of said gang-switch depending upon which cone has a bat thereon, means controlling said master switch to close a gang of switches when a cone has been properly positioned to receive fur, a time-delay switch connected to be energized to start a timing cycle each time one of said gangs of switches is closed, and a circuit for controlling other operations of the apparatus, said circuit including a solenoid-controlled switch which is operated at the start of each timing cycle of said time-delay switch.

2. In hat making apparatus for carrying on a cycle of bat-forming operations, the combination of: a bat former including, a plurality of cones, supporting means for said cones, and a forming tower having door means which is opened to move said cones to and from said forming tower; and a control means for said apparatus including, a timer, a circuit to interrupt the operation of said timer and prevent the starting of a new cycle of operations, and a switch operated by the opening of said door means to render said circuit ineffective if said door means is opened.

3. In hat making apparatus, the combination of, a fur conveying and separating mechanism, a bat former, a cyclic control means including a timer to exert control upon said mechanism and said bat former, interlocking means to deenergize said timer and thereby interrupt the operation of said cyclic control means to prevent the starting of a new cycle of operations, and means to render said interlocking means ineffective if said bat former is provided with an empty cone to receive fur.

4. In hat making apparatus in which a cone is positioned to receive fur to form a bat thereon and the bat is then wetted and removed from the cone, the combination of, a bat former including a plurality of cones, a wetting mechanism, a suction means associated with said cones, and a control mechanism including a multiple unit gang-switch each gang of which controls the suction upon one cone during the time that fur is being deposited thereon and simultaneously exerts control upon the spraying of the most recently formed bat upon another cone.

5. In hat making apparatus in which a cone is positioned to receive fur to form a bat thereon and the bat is then wetted and removed from the cone, the combination of, a bat former including a plurality of cones, a wetting mechanism, a suction means associated with said cones, and a control mechanism including a multiple unit gang-switch each gang of which controls the suction upon one cone during the time that fur is being deposited thereon and simultaneously exerts control upon the spraying and removal of the most recently formed bat upon another cone.

6. In hat making apparatus, the combination of, a bat former including a plurality of individually supported cones and suction means for each of the cones, spray means, and a control circuit including a multiple-unit gang-switch having a gang of switches corresponding to each of said cones, and means to close one gang of switches at the time a first cone is positioned to have a bat formed thereon and a second cone with a bat thereon is positioned to be sprayed, said gang including a switch which controls a circuit to maintain suction upon said first cone and also including a switch controlling a circuit to cause said spray means to spray said second cone.

7. In hat making apparatus, a bat former including a cone which is provided with controlled suction means, and control means including a switch to maintain suction upon said cone while it is having a bat formed thereon and an interlocking circuit including a time-delay switch which maintains a suction upon said cone for a predetermined time after the bat has been completed.

8. In hat making apparatus of the type where a bat is formed by depositing a predetermined quantity of fur upon a cone, means to lift the fur in an even stream and deliver it in a sheet-like supply to a fur depositing means, comprising, a chute having a vertically extending passageway having an air inlet and a fur inlet at the bottom end thereof and having uniform cross-sectional area throughout its length, a pair of sieve-rollers extending across the entire top of said passageway, and means to cause air and fur to move into the bottom of said passageway and upwardly to said sieve-rollers and to cause the air to be exhausted through said sieve-rollers and the fur to be deposited on the periphery of said rollers, said last named means including a rotating means positioned at the bottom end of said passageway and extending across a substantial portion of the space enclosed by the bottom end of said chute, and thereby forming a restricted bottom inlet to said passageway.

9. In apparatus of the class described, the combination of, means to move a cone to a position where a bat may be removed therefrom including an air-motor unit, means to supply air to said air-motor unit, a pressure responsive switch connected to be responsive to the air pressure effective on said air-motor unit, and means controlled by said pressure responsive switch to shut off the supply of air to said air-motor unit at the time a cone has been moved to the bat removing position.

10. In hat making apparatus, the combination of, motive means to cause relative movement between a bat forming tower and each of a plurality of cone retaining means to successively position the cones in an upright position to have bats formed thereon, cone-moving means to move each cone from its upright position to a position where a bat may be removed therefrom, and control means including a switch means related to said cone-moving means which opens a circuit when a cone has been properly positioned to have a bat removed therefrom and which closes said circuit to permit continued operation of the apparatus when the cone has been moved back to its upright position.

11. In hat making apparatus, the combination of, motive means to cause relative movement between a bat forming tower and each of a plurality of cone retaining means to successively position the cones to have bats formed thereon, fluid operated cone-moving means to move each cone to a position where a bat may be removed therefrom, and control means including a pressure responsive switch means connected to the fluid pressure effective on said cone-moving means which opens a circuit when said pressure reaches a predetermined value and which closes said circuit when said pressure reaches its normal value.

12. In hat making apparatus, the combination of, a bat former including a forming tower and a cone, means to supply fur in predetermined quantities to said forming tower, flipper means to move said cone to a bat-stripping station and retain it at said bat-stripping station for a predetermined period and then return the cone to its former position, a normally automatic control means exerting control upon said flipper means but including manual switching means to permit manual control, and a flexible timing mechanism for the apparatus to exert supervisory control upon the delivery of fur to said cone and the removal of the bats, said timing mechanism automatically compensating its timed operations to insure an operative sequence of operation of the apparatus.

13. In hat making apparatus, the combination of, a bat former including a forming tower and a cone, means to supply fur in predetermined quantities to said forming tower, flipper means including an air-cylinder to move said cone to a bat-stripping station and retain it at said bat-stripping station for a predetermined period and then return the cone to its former position, a normally automatic control means connected to the air supply to said air-cylinder and exerting control upon said flipper means but including manual switching means to permit manual control, and a flexible timing mechanism for the apparatus to exert supervisory control upon the delivery of fur to said cone and the removal of the bats, said timing mechanism automatically compensating its timed operations to insure an operative sequence of operation of the apparatus.

14. In hat making apparatus, the combination of, an arm adapted to receive a bat forming cone and to move said cone to and from a position where a bat thereon may be removed, a cylinder-piston unit mechanically connected to said arm so that when fluid is supplied to said unit said arm will be operated, and a pressure responsive means connected to said unit to be responsive to the fluid pressure therein and adapted to snap in one position when said fluid pressure reaches a predetermined value and to snap into its other position when said fluid pressure reaches substantially normal pressure.

15. In hat making apparatus, the combination of: a plurality of cones; means to deposit fur on said cones to form bats thereon; means to move said cones individually to and from a bat-stripping station; and control means including a first circuit which is completed by the closing of a first switch at the time a cone has been moved to its bat-stripping station to thereby initiate the return of the cone from its bat-stripping station, and a second circuit including a second switch which is closed at the time the cone is returned from its bat-stripping station to thereby condition the apparatus so that the operations will automatically continue.

16. In hat making apparatus, the combination of: a plurality of cones; means to deposit fur on said cones to form bats thereon; means to move said cones individually to and from a bat-stripping station; and control means including a first circuit which is completed by the closing of a first switch at the time a cone has been moved to its bat-stripping station to thereby initiate the return of the cone from its bat-stripping station, and a second circuit including a second switch which is closed as a result of the completing of said first circuit and a third switch which is closed at the time the cone is returned from its bat-stripping station to thereby condition the apparatus so that the operations will automatically continue.

17. In hat making apparatus, the combination of, a bat former mechanism including a forming tower and a cone normally positioned upon a cone-supporting structure and adapted to receive fur while within said forming tower and on said cone-supporting structure, fur delivery means to supply fur to said cone, means to move said cone from said cone-supporting structure to a bat-stripping station, and an interlocking control means effective to stop the operation of said fur delivery means if said cone has not been moved to said bat-stripping station and returned to said cone-supporting structure at the time said cone is to receive fur to form another bat.

18. In apparatus for forming bats by depositing successive quantities of fur on perforated cones, the combination of, means to deliver fur from a source of supply in predetermined quantities to a bat former including a cone, means to wet each bat after it is formed, means to move said cone with a bat thereon from its normal position to a position to permit the bat to be removed and to return the cone to said normal position, cyclic control means to exert control upon the delivery of fur to said bat former, and means to stop said cyclic control means if the previous bat has not been wetted and removed and if the cone which held said previous bat has not been returned to said normal position.

19. In the art of forming hats by means of an apparatus which delivers fur to a weighing mechanism where the fur is automatically divided into individual quantities of fur and then conveyed to a bat former where it is deposited in the form of bats, the steps of, controlling the operation of the bat former and the bat wetting and removing mechanisms by means of an interacting control which causes the steps to occur in proper sequence and in proper timed relationship, automatically controlling the delivery of the fur to the bat former in predetermined quantities, timing said delivery control to stop the delivery of the fur to the bat former at a predetermined time after the operations are started, and interlocking the operation of the bat former and said delivery control to prevent the stopping of the delivery of fur to the bat former and to start the running of a new sequence of operations if the bat former and bat wetting and removing mechanisms have completed their sequence of steps of operations.

20. In the art of forming hats by means of an apparatus which delivers fur in predetermined quantities to a bat former where it is deposited upon cones in the form of bats, the steps of, controlling the means for delivering fur to the bat former by a cyclic means, controlling the mechanism which handles the cones so that a bat is formed on the cones and is then wetted and removed, and preventing the starting of a new cycle of operations by said cyclic means if the cone which is to receive the next bat has not been moved to the position where the previous bat could be removed therefrom and then been returned to its proper position to receive a bat.

21. In the art of depositing fur upon cones to make hats, the steps of, moving fur from a source of supply through a conveyor system to a forming tower, and intermittently stopping and restarting a pair of rollers in said conveyor system to cause fur to accumulate on said rollers, whereby the quantity of fur which is accumulated is immediately deposited in the forming tower when the rollers are restarted and a layer of fur is thereby immediately formed upon the cone.

22. In the art of depositing fur upon cones to form hats, the steps of, supplying fur to a fur conveying and separating mechanism, delivering the fur in predetermined quantities from said mechanism to a bat former including a cone, and stopping one unit of said mechanism during the time that each separate quantity of fur starts to reach said unit, positioning the elements of said bat former to receive the quantity of fur which is being received by said unit, and restarting said unit after a portion of the quantity of fur has accumulated at said unit, whereby fur is delivered to a bat forming element to form a bat thereon and the initial quantity of fur delivered to the bat forming element is sufficient to form a layer of fur over the entire surface thereof.

23. In the art of depositing fur in predetermined quantities upon cones, the steps of, moving fur from a source of supply to a pair of rollers, rotating said pair of rollers to move the fur to a fur depositing station and onto a cone until a bat has been formed thereon, positioning a cone to receive fur to form another bat, and stopping the rotation of said pair of rollers for a predetermined period of time, whereby a quantity of fur is accumulated on said pair of rollers during the time that they are stopped, and this quantity of fur is immediately deposited on the cone when the pair of rollers are started again, and a layer of fur is thereby immediately formed upon the cone.

24. In the art of depositing fur in predetermined quantities upon cones, the steps of, supplying fur from a source to a forming tower through a pair of sieve-rollers, depositing the fur upon a perforated cone in said forming tower, stopping rotation of said sieve-rollers and removing the cone from said forming tower, positioning a cone in said forming tower, and starting the rotation of said sieve-rollers, whereby a quantity of fur is collected upon said sieve-rollers during the time that they are stopped and this quantity of fur is immediately deposited upon the cone in the form of a thin layer.

25. In hat making apparatus, the combination of, cone-retaining means to hold a cone in proper position to receive fur to form a bat, fur-delivery mechanism including a roller means to deliver a predetermined quantity of fur to the cone, said roller means being adapted when not operating to prevent the delivery of fur to the cone by accumulating the fur which is delivered to it, means controlling the operation of said roller means to stop the roller means while said cone is being positioned and to thereby collect a quantity of fur and to restart said roller means and immediately deliver said quantity of fur to the cone so that a layer of fur is thereby immediately formed on the cone.

26. In hat making apparatus, the combination of, cone-retaining means to hold a cone in proper position to receive fur to form a bat, fur separating and delivering mechanism to deliver the proper quantity of fur to the cone to form a bat, said mechanism including a fur-accumulating unit which is adapted to intercept the stream of fur being delivered to the cone and accumulate this fur, and control means to operate said fur-accumulating unit to intercept the stream of fur and prevent the delivery of fur to the cone while the cone is being positioned, said control means being effective to cause said fur-accumulating unit to release the quantity of fur accumulated and to deliver this fur to the cone when the cone is properly positioned to thereby immediately form a layer of fur over substantially the entire fur-depositing surface of the cone.

27. In apparatus of the class described, the combination of, a forming tower having door means forming part of the walls thereof, a plurality of cones, a cone-positioning means to move said cones to and from said forming tower through space normally closed by said door means, and a control means having a switch means operated by the opening movement of said door means to complete a circuit to said cone-positioning means, whereby the opening of said door means initiates the movement of one cone from said forming tower, said switch means being operated by the closing movement of said door means to initiate a timed spraying cycle to spray the cone most recently removed from said forming tower.

28. In apparatus of the class described, the combination of, a forming tower having door means forming part of the walls thereof, a plurality of cones, positioning mechanism to cause relative movement between said cones and said forming tower whereby said cones are successively positioned within said forming tower to receive fur and when sufficient fur to form a bat has been deposited upon one cone the fur is then directed onto an empty cone, and control means having an actuating mechanism operated by the opening movement of said door means to cause said positioning mechanism to operate only after the opening of said door means, said actuating mechanism being operated by the closing movement of said door means to initiate a timed treating cycle controlling the treating of the fur deposited on the cone most recently positioned outside said forming tower.

29. In apparatus of the class described, the combination of, a forming-tower-and-cone assembly including a plurality of cones and cone-positioning means which when operated moves one of said cones with a bat thereon from said forming tower to a bat-treating position and moves another of said cones into said forming tower to a fur-depositing position, and a control mechanism including means to control the depositing of fur upon the cone in the fur-depositing position and to initiate the operation of said cone-positioning means, said control mechanism also including means operated by the completion of the step of moving one cone to the bat-treating position to thereby initiate a timed treating cycle controlling the treating of the fur on the cone in the bat-treating position.

30. In apparatus of the class described, the combination of: fur-depositing mechanism including, a plurality of cones, and cone-positioning means which when operated moves one of said cones with a bat thereon from its fur-depositing position to its bat-treating position and moves another of said cones to its fur-depositing position; and a control mechanism including, means to control the depositing of fur upon the cone in its fur-depositing position, means to initiate the operation of said cone-positioning means each time a bat has been formed on a cone, and means actuated by the movement of one cone to its bat-treating position to thereby initiate a timed treating cycle controlling the treating of the fur on the cone in the bat-treating position.

31. In mechanism for making hats, the combination of, apparatus for depositing fur to form a bat on a cone, control means for said apparatus, spraying means, flipper means for automatically moving a cone to a position so that a bat thereon may be removed, and a controller including a separate timer unit which starts its timing cycle after a bat is formed on said cone by said apparatus and which completes its timing cycle a predetermined time thereafter, said controller regulating the operations of said spraying means and said flipper means.

32. In mechanism for making hats, the combination of, apparatus for depositing fur to form a bat on a cone and for conditioning the cone for flipping, control means for said apparatus, spraying means, flipper means for automatically moving a cone to a position so that a bat thereon may be removed, and a controller including a separate timer unit which starts its timing cycle after a bat is formed on said cone and said cone has been conditioned for flipping by said apparatus and which completes its timing cycle a predetermined time thereafter, said controller regulating the operations of said spraying means and said flipper means.

33. In mechanism for making hats, the combination of, apparatus for depositing fur to form a bat on a cone and for positioning the elements of the mechanism so that the cone can be moved to its bat-removing position, control means for said apparatus, spraying means, flipper means for automatically moving a cone to a position so that a bat thereon may be removed, and a controller including a separate timer unit which starts its timing cycle after a bat is formed on said cone and the elements of said mechanism are so positioned that said cone may be moved to its bat-removing position by said apparatus and which completes its timing cycle a predetermined time thereafter, said controller regulating the operations of said spraying means and said flipper means.

34. In hat making apparatus, the combination of, spraying means, flipper means for automatically inverting a cone so that a bat thereon may be removed, and control means for said flipper means including a separate control unit which controls the time of actuation of said flipper means dependent upon the time of completion of the spraying operation by said spraying means.

35. In hat making apparatus, the combination of: a bat former including a cone and means to deposit fur on said cone; a spraying apparatus to wet the bat formed on said cone; and a control means including, a solenoid-control unit controlling said bat-spraying apparatus, means to energize said solenoid-control unit and start a timing operation when a bat has been formed, and an independently operating time unit which is started when the spraying operation is started and which timer unit is effective a predetermined time thereafter to deenergize said solenoid-control unit and stop the spraying operation—whereby a bat is formed on said cone and the spraying operation is started and the duration of the spraying operation is controlled by said timer unit.

36. In hat making apparatus, the combination of, a bat former including a cone and means to deposit fur on said cone and having a forming tower with door means which is opened and closed for moving said cone from said tower, a spraying apparatus to wet the bat formed on said cone, and a control means including an operating unit controlling said spraying apparatus and in turn controlled by an independently operating timer unit, said timer unit being operated to start its timing operation when said cone has been removed from said tower and said door means has been reclosed and to stop its timing operation and thereupon shut off said spraying apparatus a predetermined time thereafter, whereby a bat is formed on said cone and the cone is then removed from said forming tower and the bat is then sprayed for a predetermined time.

37. In hat making apparatus, the combination of, a bat former including a cone and means to deposit fur on said cone, a spraying apparatus to wet the bat formed on said cone, and control means including an independently operating timer unit which is automatically started by the completing of the operations which are incident to the completion of the step of depositing fur to form a bat and which timer unit acts a predetermined time after it is started to stop the spraying operation.

38. In hat making apparatus, the combination of, a bat former including a plurality of individually supported cones and suction means for each of said cones, a control circuit including a multiple-unit gang-switch having a plurality of gangs corresponding in number to the number of said cones, means to close one of said gangs of switches each time a cone is moved to the bat-forming position and another cone is moved to the bat-spraying position, said control circuit including a switch which controls a circuit to maintain suction upon the cone in the bat-forming position and also including a switch controlling a circuit to spray the bat upon the cone in the bat-spraying position.

39. In hat making apparatus in which a cone is positioned to receive fur to form a bat thereon and the bat is then wetted and removed from the cone, the combination of, a bat former including a plurality of cones, a wetting mechanism, and a control mechanism including a multiple-unit means having a plurality of units corresponding in number to the number of said cones, each of said units comprising a bank of unitary operating assemblies each of which exerts control upon a particular portion of the apparatus, the assemblies of each bank being simultaneously operated by a common controller, said units being individually operable so that each is operated when the cone corresponding to it has had a bat formed thereon.

40. In hat making apparatus in which a cone is positioned to receive fur to form a bat thereon and the bat is then wetted and removed from the cone, the combination of, a bat former including a plurality of cones, a wetting mechanism, and a control mechanism including a multiple-unit means having a unit corresponding to each of said cones, each of said units being formed of a series of control circuits which are simultaneously completed by the operation of a common controller, said units being individually operable so that each is closed when the cone corresponding to it is to be wetted, said control mechanism also including a timing unit to control the duration of the spraying operation.

41. In hat making apparatus in which a cone is positioned to receive fur to form a bat thereon and the bat is then wetted and removed from the cone, the combination of, a bat former including a plurality of cones, a wetting mechanism, and a control mechanism including a multiple-unit means having a unit corresponding to each of said cones, each of said units being formed of a series of control circuits which are simultaneously completed by the operation of a common controller, said units being individually operable so that each is closed when the cone corresponding to it is to be wetted, said control mechanism also including a timing means to control the wetting of each bat and the shutting off of the suction from the bat during the wetting operation, said timing means being started as an incident to the operation of said multiple-unit means so that its timing operations are started at the time the circuits of each unit are closed.

42. In hat making apparatus of the class described, the combination of, a bat former including a forming tower and cone-supporting means with means to cause relative movement therebetween so that a cone is positioned to receive fur to form a bat thereon, spraying mechanism to spray each bat after it is formed, flipper mechanism to move the cone with a bat thereon to a position where the bat may be removed, and control means to sequentially operate the apparatus so that when a bat is completed it is properly sprayed and then stripped from the cone and the cone is in due course properly positioned so that the operation of the apparatus may continue, said control means including a flexible operating set of interlocking units one of which prevents the starting of the spraying operation until the bat is formed and another of which interlocking units prevents the operation of said flipper mechanism until the spraying operation is completed, and said set of interlocking units also including means to permit the continued operation of the apparatus if the cone is moved to and from the bat-removing position after the bat has been formed thereon.

43. In hat making apparatus, the combination of: a bat former including, a forming tower, a cone, means to supply fur in predetermined quantities to said forming tower, and means to move said cone to its position where a bat may be removed therefrom; and control means including a plurality of individually operating timing units for controlling the various operations and a flexible timing mechanism for the apparatus to exert supervisory control upon the delivery of fur to said cone and the removal of the bats, said timing mechanism automatically compensating its timed operations to insure an operative sequence of operation of the apparatus.

44. In apparatus of the class described, the combination of: a forming tower having door means forming part of the walls thereof; a plurality of cones; a cone-positioning means to move said cones to and from said forming tower through the space normally occupied by said door means; and a control means including a multiple-gang switch and a switch operated by the opening movement of said door means to complete a circuit to said cone-positioning means, said control means also including a master switch operated upon the positioning of one cone in the forming tower and the positioning of another cone outside the forming tower, said master switch controlling the selection of the gang to be closed of said multiple-gang switch—whereby the opening of said door means initiates the movement of one cone from the forming tower and the movement of another cone into the forming tower, and whereby the positioning of said cones exerts control upon the closing of the proper gang of said multiple-gang switch.

45. In apparatus of the class described, the combination of, a forming tower having door means forming part of the walls thereof, a plurality of cones, a cone-positioning means to move said cones to and from said forming tower through the space normally closed by said door means, a control means including a multiple-unit gang-switch and having a switch operated by the opening movement of said door means to complete a circuit to said cone-positioning means and a master switch operated upon the positioning of one cone in the forming tower and the positioning of another cone outside the forming tower to control the closing of one gang of said multiple-unit gang-switch, whereby the opening of said door means initiates the movement of one cone from said forming tower and the movement of another cone into said forming tower, and whereby one gang of said multiple-unit gang-switch is closed after the cones have been properly positioned.

46. In apparatus of the class described, the combination of, a forming tower having door means forming part of the walls thereof, a plurality of cones, a cone-positioning means to move said cones to and from said forming tower through the space normally closed by said door means, a control means including a multiple-unit regulator each unit of which includes a set of control elements, said control means also including a master control mechanism which is operated by the opening and closing movement of said door means, said master control mechanism being effective upon the opening of said door means to cause said cone-positioning means to be actuated to initiate the movement of one cone from said forming tower and the movement of another cone into said forming tower, said control means including a unit-selecting mechanism for selecting the particular unit to be operated, the unit depending upon which of the cones has a bat thereon to be sprayed.

47. In apparatus of the class described, the combination of, means to move a cone to a position where a bat may be removed therefrom including an air-motor unit which comprises a vertically extending cylinder-piston unit, means to supply air to the cylinder of said cylinder-piston unit, a pressure-responsive element connected to be responsive to the air pressure within said cylinder, and means controlled by said pressure-responsive element to shut off the supply of air to said cylinder at the time a cone has been moved to the bat-removing position and the pressure has built up in said cylinder.

48. In apparatus of the class described, the combination of, means to move a cone to a position where a bat may be removed therefrom including a fluid-motor unit, means to supply fluid to said fluid-motor unit, a pressure-sensitive unit connected to be responsive to the fluid pressure within said fluid-motor unit, and means controlled by said pressure-sensitive unit to shut off the supply of fluid to said fluid-motor unit at the time a cone has been moved to the bat-removing position and the fluid pressure has substantially equalized.

49. In hat making apparatus of the class described, the combination of: means to move a cone to a position where a bat may be removed therefrom including, a swinging arm which is adapted to move between two limits from one extreme position where the cone is upright to another extreme position where the cone is inverted, and a power unit to move said arm, which power unit is stalled when said arm reaches its extreme position where the cone is inverted; power supply means constituting a supply of power to said power unit with power available in excess of that necessary to move the cone; and control means including a unit responsive to conditions resulting from the overloading of said power unit to control the delivery of power by said power supply means—whereby the cone is moved to the inverted position and is then returned as a result of the conditions which are set up due to the stopping of the movement of said arm.

50. In apparatus of the class described, the combination of, means to move a cone to a position where a bat may be removed therefrom including a fluid-operated unit having a pressure chamber, means to supply fluid to said fluid-operated unit, a pressure-responsive means connected to be responsive to the pressure within said chamber, and means controlled by said pressure-responsive means to shut off the supply of fluid to said fluid-operated unit when the cone has been moved to the extreme limit of its permitted travel as indicated by the rise in pressure within said chamber which results from the increased load upon said fluid-operated unit.

51. In the art of controlling the operation of a bat former in which a bat is formed upon a cone and the cone is then moved to and from its bat-stripping position where the bat is removed, the steps of, controlling the supplying of power to the cone-moving mechanism from a source where the power available is in excess of that required to perform the inverting operation, impeding the movement of the cone-inverting mechanism to cause an abnormal load which is in excess of the load necessary to invert the cone, and employing the conditions developed as the result of the excess load to control the apparatus.

52. In hat making apparatus, the combination of: a bat former including a cone-supporting structure and a plurality of cones positioned on said cone-supporting structure; fur-delivery means to supply fur to said bat former to form bats on said cones; means to receive a cone after a bat has been formed thereon and to move said cone to its bat-stripping station and to return said cone to said cone-supporting structure; and means to control said fur-delivery means including, a circuit having a plurality of switches one of which is associated with said cone, said switches being connected electrically in series to thereby form a series control circuit, said series control circuit being normally effective to control a control switch, which control switch is effective when moved to a first position to stop the supplying of power for movement of said cone toward its bat-stripping station, and which control switch is effective when moved to a second position to set up a circuit which permits continued operation of the apparatus.

53. In hat making apparatus of the class described, the combination of, a forming tower having door means forming part of the walls thereof, a flipper mechanism to move a cone with a bat thereon to a bat-removing position, a spray means to spray a bat after it is formed upon the cone and including a time-control unit, an interlock switch unit which is moved to a first position upon the starting of a timing cycle of said time-control unit and is then held in said first position by an interlock means, said interlock switch unit being effective when in said first position to permit the actuation of said flipper mechanism, means effective at the end of the timing cycle of said time-control unit to actuate said flipper mechanism, a first switching unit which is moved from a first position when said flipper mechanism moves a cone to its bat-removing position, said first switching unit being effective when moved from said first position to release said interlock means so that said interlock switch unit is moved to a second position with the result that said flipper mechanism returns the cone from the bat-removing position, said interlock switch unit being effective when moved from said first position to cooperate with said first switching unit to permit the opening of said door means when said first switching unit is returned to its first position upon the return of the cone from the bat-removing position.

54. In hat making apparatus of the class described, the combination of, fur-depositing means to deposit fur upon a cone to form bats, a first control means to control said fur-depositing means, a spraying mechanism to spray each bat after it is formed, spray-control mechanism to control each spraying operation and including a timing unit which is energized so as to start a timing cycle when a bat is to be sprayed, an interlock switch having an armature, a solenoid means to raise said armature at the time said timing unit is started to thereby set up a cone-moving circuit to a cone-moving mechanism, said interlock switch including an interlock means which is effective to maintain said armature in its raised position, means associated with said timing unit to deliver power to said cone-moving circuit after each spraying cycle is completed, means to release said interlock means so that said armature drops to open said cone-moving circuit when the cone has been moved, and means which is rendered effective by the falling of said armature when said interlock means is released to permit the continued operation of the apparatus under the control of said first control means.

55. In hat making apparatus, the combination of: a bat former including a forming tower and means to position a cone therein to receive fur and means to then move the cone with a bat thereon to a bat-stripping position where the bat may be removed; and control means including a switch means which is actuated when the cone reaches its bat-stripping position to thereby initiate the returning of the cone, and said control means also including a switch means which is actuated when the cone is returned from its bat-stripping position to permit the continued operation of the apparatus.

56. In hat making apparatus of the class described, the combination of, a bat former including a forming tower and means to successively position cones to receive fur to form bats thereon, cone-moving means to move each cone having a bat thereon to its bat-stripping position, means to supply power to said cone-moving means including a control unit which may be positioned in either a first position or a second position and which prevents said cone-moving means from starting when said control unit is in said second position, means to move said control unit to its first position when a cone has had a bat formed thereon, means effective as an incident to the movement of the cone to its bat-stripping position to cause said control unit to move to its second position, and means effective when said control unit is in its second position to permit the continued operation of the apparatus.

57. In hat making apparatus, the combination of, a plurality of individually operative cone-moving units and a plurality of individual switch means, one of which is associated with each of said cone-moving units, said switch means being effective to close a circuit so that said cone-moving units may be operated when all of said cone-moving units are in the normal position, and said switch means being effective to close another circuit so that said cone-moving units may not receive further power when any one of said cone-moving units is in the position so that a cone is at its bat-stripping station.

58. In hat making apparatus, the combination of: a bat former including a cone-supporting structure and a plurality of cones positioned on said cone-supporting structure; fur-delivery means to supply fur to said bat former to form bats upon said cones; means to receive a cone after a bat has been formed thereon and to move said cone to its bat-stripping station and to return said cone to said cone-supporting structure; and means to control said fur-delivery means including, a plurality of switches, the operation of one of which is effective to close a first switch when a cone is moved to its bat-stripping station, and the operation of one of which is effective to close a second switch when the cone is returned to the cone-supporting structure, and means connecting said first switch and said second switch so that if both of said switches are not closed the delivery of fur to the bat former cannot be continued, whereby the continuation of the delivery of fur by said fur-delivery means is dependent upon the closing of both of said first and second switches, and whereby the delivery of fur to the bat former is stopped when a cone would normally be positioned to receive another bat if the cone has not been moved to the bat-stripping station so that said first switch is closed and then returned to said cone-supporting structure so that said second switch is closed.

59. In hat making apparatus, the combination of: a bat former including a cone-supporting structure and a plurality of cones positioned on said cone-supporting structure; fur-delivery means to supply fur to said bat former to form bats upon said cones; means to receive a cone after a bat has been formed thereon and to move said cone to its bat-stripping station and to return said cone to said cone-supporting structure; and means to control said fur-delivery means including, a plurality of switches, the operation of one of which is effective to close a first switch when a cone is moved to its bat-stripping station, and the operation of one of which is effective to close a second switch when the cone is returned to the cone-supporting structure, and means connecting said first switch and said second switch so that if both of said switches are not closed the delivery of fur to the bat former cannot be continued, whereby the continuation of the delivery of fur by said fur-delivery means is dependent upon the closing of both of said first and second switches, and whereby the delivery of fur to the bat former is stopped when a cone would normally be positioned to receive another bat if the cone has not been moved to the bat-stripping station so that said first switch is closed and then returned to said cone-supporting structure so that said second switch is closed; said plurality of switches comprising a switch associated with each of said cones, whereby each of said switches is operated upon the movement of its cone to its bat-stripping station.

60. In hat making apparatus, a bat former including a cone which is provided with controlled suction means, and control means including a unit to maintain suction upon said cone while it is having a bat formed thereon and an interlocking mechanism including a time-delay unit which maintains suction upon said cone for a predetermined time after the bat has been completed, said time-delay unit having means associated with the other portions of the apparatus to cause said time-delay unit to start its timing cycle each time sufficient fur has been deposited upon said cone to form a bat, and said time-delay unit being effective at the end of its timing cycle to substantially shut off the suction from said cone.

61. In hat making apparatus, the combination of: a bat-former mechanism including, a forming tower having door means forming part of the wall structure thereof, means to actuate said door means, and a cone normally positioned upon a cone-supporting structure and adapted to receive fur while within said forming tower and on said cone-supporting structure; fur-delivery means to supply fur to said cone; means to move said cone to and from said forming tower through the space normally closed by said door means; and control means interlocking said fur-delivery means and said door means, said control means being effective, after sufficient fur has been supplied to said cone to form a bat, to prevent the operation of said fur-delivery means until said door means is actuated to permit the removal of said cone from said tower.

62. In hat making apparatus, the combination of: motive means to cause relative movement between a bat forming tower and each of a plurality of cone-retaining means to successively position the cones to have bats formed thereon; cone-moving means to move each cone to a position where a bat may be removed therefrom; and a control mechanism including, a common controller means to control the supplying of power alternately to said motive means and to said cone-moving means, an element which is moved to an active position whereby said cone-moving means may receive power, and an interlock which is rendered effective to hold said element in said active position and which interlock is released only after said cone-moving means operates.

JOHN E. KANE

CERTIFICATE OF CORRECTION.

Patent No. 2,207,407.  July 9, 1940.

JOHN E. KANE.

It is hereby certified that error appears in the printed specification of the above numbered patent requiring correction as follows: Page 1, second column, line 1, for the word "four" read --fur--; page 3, first column, line 16, strike out "the" before "scale"; page 5, second column, line 68, for "throug" read --through--; page 7, first column, line 11, for "a sindicated" read --as indicated--; lines 44, 49 and 72, before "cone" and after "one" insert quotation marks; line 46, before "cone" and after "two" insert quotation marks; and second column, line 51, after "the" at the end of the line, insert --spraying operation.--; page 10, second column, line 34, for "predeterminate" read --predetermined--; line 44, for the reference numeral "630" read --530--; page 14, second column, line 62, claim 35, for "time" read --timer--; and that the said Letters Patent should be read with this correction therein that the same may conform to the record of the case in the Patent Office.

Signed and sealed this 31st day of December, A. D. 1940.

Henry Van Arsdale,
Acting Commissioner of Patents.

(Seal)